US008633947B2

(12) United States Patent
Kitahara

(10) Patent No.: US 8,633,947 B2
(45) Date of Patent: Jan. 21, 2014

(54) COMPUTER-READABLE STORAGE MEDIUM HAVING STORED THEREIN INFORMATION PROCESSING PROGRAM, INFORMATION PROCESSING APPARATUS, INFORMATION PROCESSING SYSTEM, AND INFORMATION PROCESSING METHOD

(75) Inventor: Shinji Kitahara, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 426 days.

(21) Appl. No.: 12/862,119

(22) Filed: Aug. 24, 2010

(65) Prior Publication Data
US 2011/0298823 A1 Dec. 8, 2011

(30) Foreign Application Priority Data

Jun. 2, 2010 (JP) ................................. 2010-127091

(51) Int. Cl.
*G09G 5/00* (2006.01)
(52) U.S. Cl.
USPC ....................................................... 345/632
(58) Field of Classification Search
USPC ....................................................... 345/632
See application file for complete search history.

(56) References Cited

U.S. PATENT DOCUMENTS

| 5,684,529 | A | 11/1997 | Yoshimi et al. |
| 6,020,891 | A | 2/2000 | Rekimoto |
| 6,057,833 | A * | 5/2000 | Heidmann et al. ............ 715/726 |
| 6,160,574 | A | 12/2000 | Oba et al. |
| 6,252,624 | B1 | 6/2001 | Yuasa et al. |
| 6,313,864 | B1 * | 11/2001 | Tabata et al. ................ 348/14.02 |
| 6,325,287 | B1 | 12/2001 | Nakajima et al. |
| 6,342,900 | B1 * | 1/2002 | Ejima et al. .................... 345/698 |
| 6,384,859 | B1 | 5/2002 | Matsumoto et al. |
| 6,474,819 | B2 * | 11/2002 | Yoder et al. ..................... 353/98 |
| 6,708,046 | B1 | 3/2004 | Takagi |
| 6,897,865 | B2 * | 5/2005 | Higashiyama ................ 345/426 |
| 7,374,490 | B2 | 5/2008 | Tahara et al. |
| 7,519,218 | B2 * | 4/2009 | Takemoto et al. ............ 382/165 |
| 7,532,224 | B2 | 5/2009 | Bannai |
| 8,115,814 | B2 | 2/2012 | Iwase et al. |

(Continued)

FOREIGN PATENT DOCUMENTS

| EP | 1 720 131 | 11/2006 |
| EP | 2 157 545 | 2/2010 |

(Continued)

OTHER PUBLICATIONS

U.S. Appl. No. 12/862,119, filed Aug. 24, 2010, Shinji Kitahara et al.

(Continued)

*Primary Examiner* — Ryan R Yang
(74) *Attorney, Agent, or Firm* — Nixon & Vanderhye P.C.

(57) ABSTRACT

An information processing section of a game apparatus executes a program including: a step of obtaining an image captured by an outer camera; a step of calculating, when detection of a marker is completed, a position and an orientation of a virtual camera based on a result of the marker detection; a step of obtaining hand-drawn data; a step of capturing, with the virtual camera, a fundamental polygon to which a texture is applied to generate a hand-drawn image, and displaying, on an upper LCD, an image in which the hand-drawn image is superimposed on the camera image; and a step of displaying a hand-drawn input image on a lower LCD.

13 Claims, 15 Drawing Sheets

(56) References Cited

U.S. PATENT DOCUMENTS

| | | | |
|---|---|---|---|
| 8,189,038 | B2 | 5/2012 | DeCusatis et al. |
| 8,305,428 | B2 | 11/2012 | Hu |
| 8,418,924 | B2 | 4/2013 | Hepworth et al. |
| 2001/0019946 | A1 | 9/2001 | Okuda |
| 2005/0018045 | A1 | 1/2005 | Thomas et al. |
| 2005/0239521 | A1 | 10/2005 | Harada et al. |
| 2005/0253924 | A1 | 11/2005 | Mashitani |
| 2005/0270368 | A1 | 12/2005 | Hashimoto |
| 2006/0038833 | A1 | 2/2006 | Mallinson et al. |
| 2006/0060463 | A1 | 3/2006 | Tokusashi |
| 2006/0171582 | A1* | 8/2006 | Eichhorn ............ 382/154 |
| 2006/0203085 | A1 | 9/2006 | Tomita |
| 2007/0001003 | A1 | 1/2007 | Lee et al. |
| 2007/0038944 | A1 | 2/2007 | Carignano et al. |
| 2007/0273644 | A1 | 11/2007 | Natucci |
| 2008/0071559 | A1 | 3/2008 | Arrasvuori |
| 2008/0100620 | A1 | 5/2008 | Nagai et al. |
| 2008/0246757 | A1 | 10/2008 | Ito |
| 2008/0266386 | A1 | 10/2008 | Maeda |
| 2008/0284842 | A1 | 11/2008 | Hu |
| 2009/0059497 | A1 | 3/2009 | Kuwahara et al. |
| 2009/0060490 | A1 | 3/2009 | Kuwahara et al. |
| 2009/0070476 | A1 | 3/2009 | Brackx et al. |
| 2009/0224999 | A1 | 9/2009 | Kuwahara et al. |
| 2009/0278764 | A1 | 11/2009 | Kuwahara et al. |
| 2009/0278974 | A1 | 11/2009 | Kuwahara et al. |
| 2009/0285484 | A1 | 11/2009 | Mallinson et al. |
| 2010/0085423 | A1 | 4/2010 | Lange |
| 2010/0304857 | A1 | 12/2010 | Suzuki et al. |
| 2010/0316367 | A1 | 12/2010 | Kuwahara et al. |

FOREIGN PATENT DOCUMENTS

| | | |
|---|---|---|
| JP | 06-339155 | 12/1994 |
| JP | 10-51711 | 2/1998 |
| JP | 2000-69404 | 3/2000 |
| JP | 2000-148904 | 5/2000 |
| JP | 2001-165144 | 6/2001 |
| JP | 2001-251396 | 9/2001 |
| JP | 2001-251398 | 9/2001 |
| JP | 2001-251399 | 9/2001 |
| JP | 2002-230586 | 8/2002 |
| JP | 2004-7214 | 1/2004 |
| JP | 2005-20559 | 1/2005 |
| JP | 2005-151162 | 6/2005 |
| JP | 2005-165776 | 6/2005 |
| JP | 2005-250950 | 9/2005 |
| JP | 2005-286714 | 10/2005 |
| JP | 2006-024175 | 1/2006 |
| JP | 2006-060516 | 3/2006 |
| JP | 2006-72667 | 3/2006 |
| JP | 2006-86099 | 3/2006 |
| JP | 2006-271663 | 10/2006 |
| JP | 2007-12025 | 1/2007 |
| JP | 2008-502206 | 1/2008 |
| JP | 2008-77437 | 4/2008 |
| JP | 2008-510254 | 4/2008 |
| JP | 2008-146109 | 6/2008 |
| JP | 2008-521110 | 6/2008 |
| JP | 2009-25918 A | 2/2009 |
| JP | 4260215 | 2/2009 |
| JP | 2009-089435 | 4/2009 |
| JP | 2009-205556 | 9/2009 |
| JP | 2010-170316 | 8/2010 |
| JP | 2010-532120 | 9/2010 |
| JP | 2010-239568 | 10/2010 |
| JP | 2010-244575 | 10/2010 |
| WO | 03/105450 | 12/2003 |

OTHER PUBLICATIONS

U.S. Appl. No. 12/946,248, filed Nov. 15, 2010, Yasuyuki Oyagi et al.
U.S. Appl. No. 13/030,499, filed Feb. 18, 2011, Yui Ehara et al.
U.S. Appl. No. 13/158,824, filed Jun. 13, 2011, Yuichiro Ito.
U.S. Appl. No. 13/158,939, filed Jun. 13, 2011, Yuichiro Ito.
U.S. Appl. No. 13/158,736, filed Jun. 13, 2011, Yuichiro Ito.
U.S. Appl. No. 13/006,039, filed Jan. 13, 2011, Hideki Konno et al,.
U.S. Appl. No. 13/243,622, filed Sep. 23, 2011, Yuichiro Ito et al.
Yokoya et al., "Stereo Vision Based Video See-through Mixed Reality" Mixed Reality, Merging Real and Virtual Worlds, Proceedings of International Symposium on Mix Reality, Merging Real and Virtual Worlds, Jan. 1, 1999, pp. 131-145, 15 pages.
Hirokazu Kato, Mark Billinghurst, "Marker Tracking and HMD Calibration for a Video-Based Augmented Reality Conferencing System," iwar, pp. 85, 2nd IEEE and ACM International Workshop on Augmented Reality, 1999, 10 pages.
Report on Nintendo DS Lite Hardwire, Mar. 2, 2006, 5 pages, http://pc.watch.impress.co.jp/docs/2006/0302/nintendo.htm.
U.S. Appl. No. 13/006,039, filed Jan. 13, 2011, Hideki Konno et al.
Report on Nintendo DS Lite Hardware, Mar. 2, 2006, download from the internet, with a partial English translation, 13 pages.
Kato et al., "An AugMented Reality System and its Calibration based on Marker Tracking", Transactions of the Virtual Reality Society of Japan, vol. 4, No. 4, 1999, pp. 607-616.
Jun. 11, 2012, Notice of Allowance for U.S. Appl. No. 13/006,039, 16 pages.
Yoon, Song-Yee et al., "Interactive Training for Synthetic Characters," American Association for Artificial Intelligence, 1999, 6 pages.
Office Action dated Mar. 29, 2013, issued in corresponding U.S. Appl. No. 12/946,248.
Notice of Allowance dated Apr. 15, 2013, issued in corresponding U.S. Appl. No. 13/030,499.
Office Action dated May 23, 2013, issued in corresponding U.S. Appl. No. 13/158,736.
Office Action dated Jul. 11, 2013, issued in corresponding U.S. Appl. No. 13/158,939.
Office Action dated Oct. 23, 2013, issued in corresponding U.S. Appl. No. 13/158,824.

* cited by examiner 25a
(THIRD POSITION)

25a
(FIRST POSITION)

F I G. 1 3
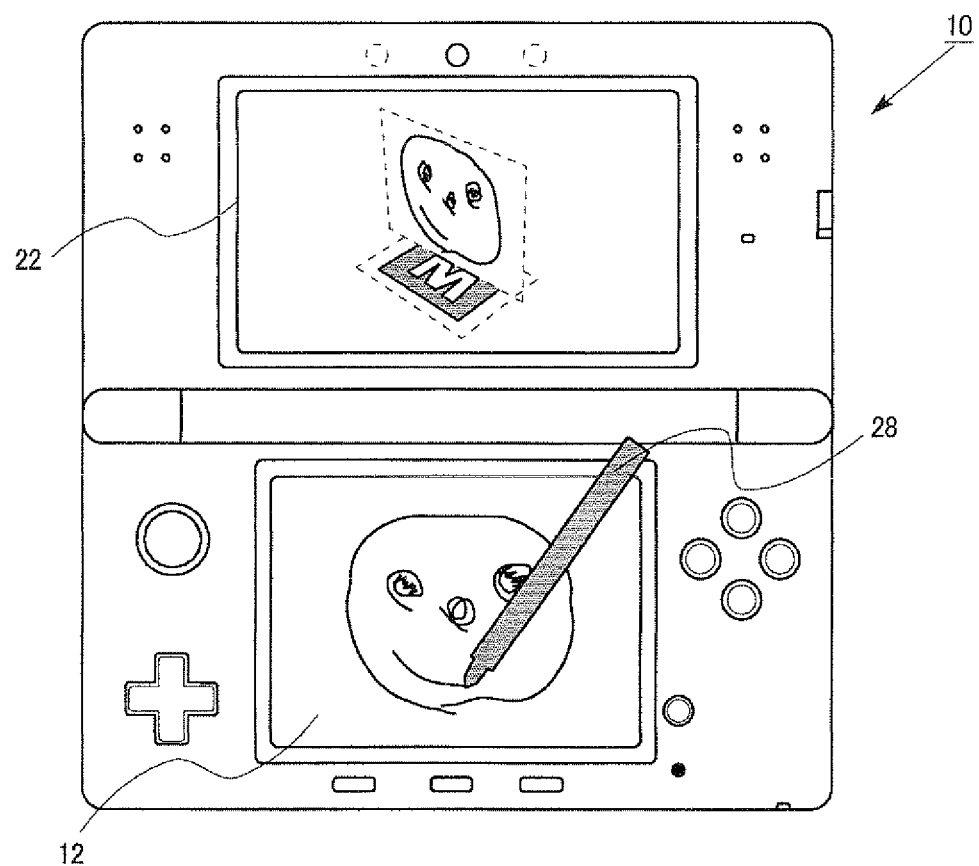

F I G. 1 4 A
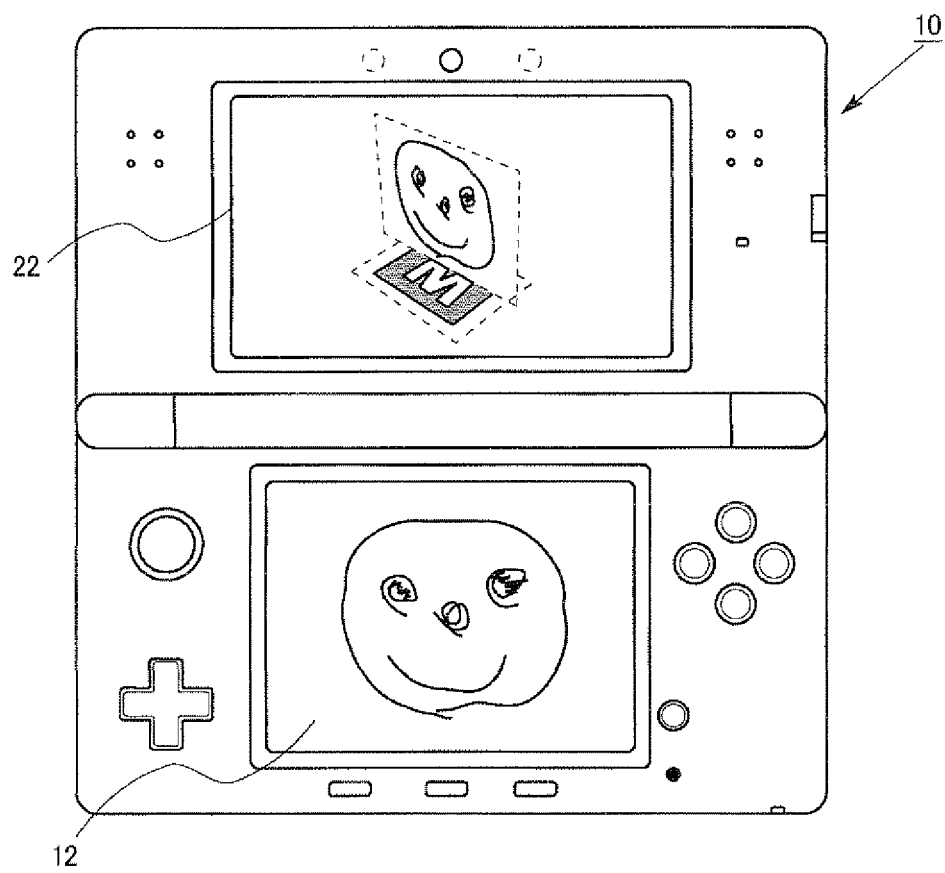

22

22

22

22

22

22

COMPUTER-READABLE STORAGE MEDIUM HAVING STORED THEREIN INFORMATION PROCESSING PROGRAM, INFORMATION PROCESSING APPARATUS, INFORMATION PROCESSING SYSTEM, AND INFORMATION PROCESSING METHOD

CROSS REFERENCE TO RELATED APPLICATION

The disclosure of Japanese Patent Application No. 2010-127091, filed on Jun. 2, 2010, is incorporated herein by reference.

BACKGROUND OF THE INVENTION

1. Field of the Invention

The present invention relates to an information processing technique for superimposing an image on a real space which is visible to a user, and displaying the image. More particularly, the invention relates to an information processing technique for superimposing an image being created by a user or an image having been created by the user on a real space which is visible to the user, and displaying the image.

2. Description of the Background Art

In recent years, an image print creating apparatus which photographs an image of a user, allows editing of the photographed image using a prepared editing device such as a touch pen, and prints the edited image, is known. For example, Japanese Laid-Open Patent Publication No. 2000-069404 (hereinafter referred to as Patent Document 1) discloses an image print creating apparatus with which a user subjects an image, which is obtained by photographing himself/herself, to a makeup process, and prints his/her favorite image.

However, in the image print creating apparatus disclosed in Patent Document 1, although the image of the user is subjected to the makeup process manually, the image to be subjected to the manual makeup process is merely a still image. That is, this image print creating apparatus merely superimposes the makeup image inputted by the user on the planar still image obtained by photographing the user, and displays the superimposed image. Therefore, the image print creating apparatus cannot cause the user to feel as if the makeup image inputted by the user exists in a real space represented by the photographed image, but causes the user to feel that two objects existing in different spaces are merely superimposed one another. Accordingly, the image print creating apparatus disclosed in Patent Document 1 cannot represent an object created by the user as if it exists in the real world (also referred to as a real space or a real environment), and therefore, cannot achieve natural augmented reality.

SUMMARY OF THE INVENTION

Therefore, an object of the present invention is to provide an information processing technique which can represent an object created by a user as if it exists in the real world, thereby achieving natural augmented reality.

The present invention has the following features to attain the object mentioned above.

An information processing program according to a first aspect causes a computer of an information processing apparatus, which is connected to an imaging device, an input device, and a display device having a screen on which a user can view a real space, to function as captured image data obtaining means, input data obtaining means, detection means, calculation means, virtual camera setting means, generation means, and display control means. The captured image data obtaining means successively obtains captured image data indicating an image captured by the imaging device. The input data obtaining means successively obtains input data indicating an image inputted by the input device. The detection means detects a specific target from the captured image data successively obtained by the captured image data obtaining means. The calculation means calculates relative positions of the imaging device and the specific target, based on a result of the detection for the specific target. The virtual camera setting means successively sets a virtual camera in a virtual space, based on a result of the calculation by the calculation means. The generation means captures, using the virtual camera, an object in the virtual space, which is indicated by the input data successively inputted by the input data obtaining means, to generate an object image corresponding to the object. The display control means causes the display device to successively display a superimposed image in which the object image generated by the generation means is superimposed on the real space on the screen.

According to the above configuration, a superimposed image in which the object image is superimposed on the real space in the screen is displayed on the display device. In this case, the object image is an input image successively inputted by the user from the input device such as a pointing device, and it is, for example, a hand-drawn image. The object image is composed of object image data generated by capturing an object with the virtual camera. Setting of the virtual camera in the virtual space is successively changed based on a result of detection (recognition) of a specific target such as a marker which is included in the captured image. Therefore, setting of the virtual camera is changed in accordance with a change in the manner in which the marker or the like is visible, due to a change in the imaging direction. Accordingly, display of the object image data of the object captured by the virtual camera is changed in accordance with the change in the imaging direction. As a result, the object image created by the user's hand-drawing or the like is displayed as if it exists in the real world, and thus natural augmented reality is achieved.

Preferably, the input device may be configured by a pointing device. In this case, the input data obtaining means obtains, at a predetermined time interval, input data indicating an object which is configured by a hand-drawn trajectory inputted to the pointing device. The display control means causes the display device to display a superimposed image in which the degree of progress of the hand-drawing in the predetermined time interval is reflected.

According to the above configuration, an object image constituted by a track which is manually inputted to the pointing device is superimposed on a background image, and displayed as if it exists in the real space. At this time, since the input data indicating the object is obtained at a predetermined time interval, if the predetermined time interval is set shorter relative to the user's hand-drawing operation, the partially-drawn object can be displayed. Therefore, the user can complete the object image while checking the displayed partially-drawn object image.

Preferably, the display device includes a first screen area on which the superimposed image is displayed; and a second screen area different from the first screen area. In this case, the display control means causes the display device to display the superimposed image on the first screen area, and causes the display device to display the inputted image on the second screen area.

According to the above configuration, the superimposed image is displayed on the first screen area, and the input image is displayed on the second screen area. Therefore, even when it is difficult for the user to check the input image in the superimposed image displayed on the first screen area, the user can check the input image displayed on the second screen area.

Preferably, the program may cause the computer to function as change means for changing a display manner of the object. In this case, the display control means causes the display device to successively display a superimposed image in which object image data indicating an object whose display manner is changed by the change means is superimposed on the captured image data.

The object, which is superimposed on the real space and displayed as if it exists in the real space, is changed in its display manner (display position and/or display shape) when displayed. Therefore, it is possible to change the display manner so as to cause the user to have a stronger sense of reality, or it is possible to change the display manner so as to cause the user to have a stronger interest.

Preferably, the change means changes a display position of the object in accordance with a predetermined rule.

By changing the position where the object is displayed, it is possible to cause the user to have a stronger sense of reality and/or a stronger interest. As an example of such change, the object may be shaken vertically or horizontally when displayed.

Preferably, the change means changes the display position of the object in accordance with a passage of time.

By changing the position where the object is displayed in accordance with a passage of time, it is possible to cause the user to have a stronger sense of reality and/or a stronger interest. As an example of such change, the object may be moved vertically or horizontally every time a predetermined period has passed (i.e., periodically).

Preferably, the change means changes a display shape of the object.

By changing the display shape of the object, it is possible to cause the user to have a stronger sense of reality and/or a stronger interest. As an example of such change, the object may be increased or decreased in size, or the object may be expanded or contracted laterally or longitudinally. At this time, the shape may be changed periodically.

Preferably, the change means changes the display shape of the object to a display shape in which a shadow of the object is applied to the object.

By applying a shadow of the object to the object, it is possible to cause the user to have a stronger sense of reality and/or a stronger interest.

Preferably, the change means changes a thickness of the object.

By giving a thickness to the object, it is possible to cause the user to have a stronger sense of reality and/or a stronger interest.

Preferably, the change means changes the thickness of the object by arranging a plurality of the objects.

By arranging a plurality of object images as planar images to give a thickness to the object, it is possible to cause the user to have a stronger sense of reality and/or a stronger interest.

An information processing apparatus according to a second aspect comprises: imaging means for capturing an image; input means by which a user inputs an image; display means having a screen on which the user can view a real space; captured image data obtaining means for successively obtaining captured image data indicating the image captured by the imaging means; input data obtaining means for successively obtaining input data indicating an image inputted by the input means; detection means for detecting a specific target from the captured image data successively obtained by the captured image data obtaining means; calculation means for calculating relative positions of the imaging means and the specific target, based on a result of the detection for the specific target; virtual camera setting means for successively setting a virtual camera in a virtual space, based on a result of the calculation by the calculation means; generation means for capturing, using the virtual camera, an object in the virtual space, which is indicated by the input data successively inputted by the input data obtaining means, to generate an object image corresponding to the object; and display control means for causing the display means to successively display a superimposed image in which the object image generated by the generation means is superimposed on the real space on the screen.

An information processing system according to a third aspect comprises; imaging means for capturing an image; input means by which a user inputs an image; display means having a screen on which the user can view a real space; captured image data obtaining means for successively obtaining captured image data indicating the image captured by the imaging means; input data obtaining means for successively obtaining input data indicating an image inputted by the input means; detection means for detecting a specific target from the captured image data successively obtained by the captured image data obtaining means; calculation means for calculating relative positions of the imaging means and the specific target, based on a result of the detection for the specific target; virtual camera setting means for successively setting a virtual camera in a virtual space, based on a result of the calculation by the calculation means; generation means for capturing, using the virtual camera, an object in the virtual space, which is indicated by the input data successively inputted by the input data obtaining means, to generate an object image corresponding to the object; and display control means for causing the display means to successively display a superimposed image in which the object image generated by the generation means is superimposed on the real space on the screen.

An information processing method according to a fourth aspect comprises: an imaging step of capturing an image by imaging means; an input step in which a user inputs an image; a display step in which the user can view a real space on a screen; a captured image data obtaining step of successively obtaining captured image data indicating the image captured in the imaging step; an input data obtaining step of successively obtaining input data indicating an image inputted in the input step; a detection step of detecting a specific target from the captured image data successively obtained in the captured image data obtaining step; a calculation step of calculating relative positions of the imaging means and the specific target, based on a result of the detection for the specific target; a virtual camera setting step of successively setting a virtual camera in a virtual space, based on a result of the calculation in the calculation step; a generation step of capturing, using the virtual camera, an object in the virtual space, which is indicated by the input data successively inputted in the input data obtaining step, to generate an object image corresponding to the object; and a display control step of causing the display step to successively display a superimposed image in which the object image generated in the generation step is superimposed on the real space on the screen.

According to the information processing apparatus of the first aspect, the information processing system of the third aspect, and the information processing method of the fourth aspect, the same functions and effects as those of the information processing program of the first aspect can be achieved.

Thus, according to the present invention, an object created by a user is represented as if it exists in the real world, and thus natural augmented reality can be achieved.

These and other objects, features, aspects and advantages of the present invention will become more apparent from the following detailed description of the present invention when taken in conjunction with the accompanying drawings.

BRIEF DESCRIPTION OF THE DRAWINGS

FIG. 13 is a diagram illustrating the state in which the user draws the object to be displayed on the upper LCD 22, by using the touch panel 13;

FIGS. 14A and 14B are diagrams illustrating examples of displayed images in a case where the position of the game apparatus 10 is changed;

DESCRIPTION OF THE PREFERRED EMBODIMENTS (Structure of Game Apparatus)

Hereinafter, a game apparatus as an information processing apparatus according to one embodiment of the present invention will be described. The present invention is not limited to such an apparatus. An information processing program to be executed in such an apparatus and an information processing system relating to such an apparatus are also within the scope of the present invention. Further, an information processing method performed by such an apparatus is also within the scope of the present invention.

Figure 1:
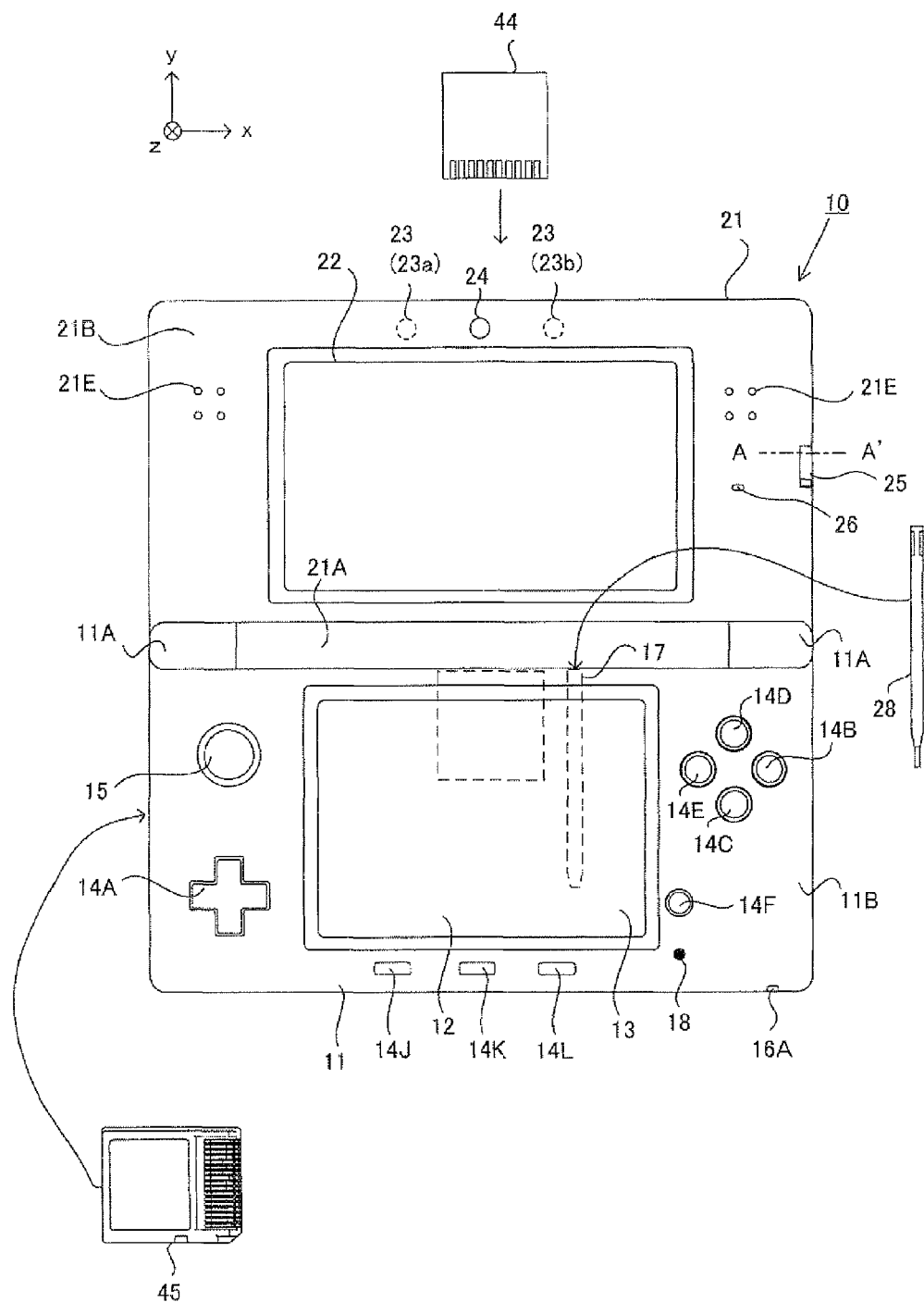
FIG. 1 is a front view of a game apparatus 10 in its opened state.
Figure 2:
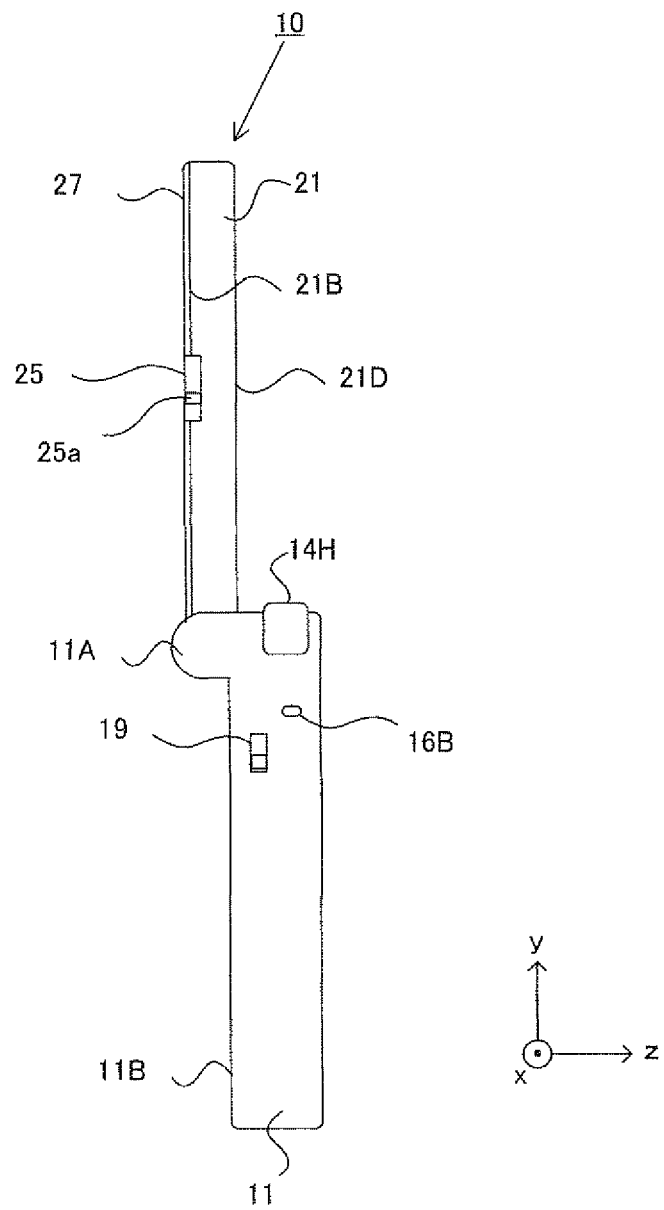
FIG. 2 is a right side view of the game apparatus 10 in its opened state.
Figure 3:
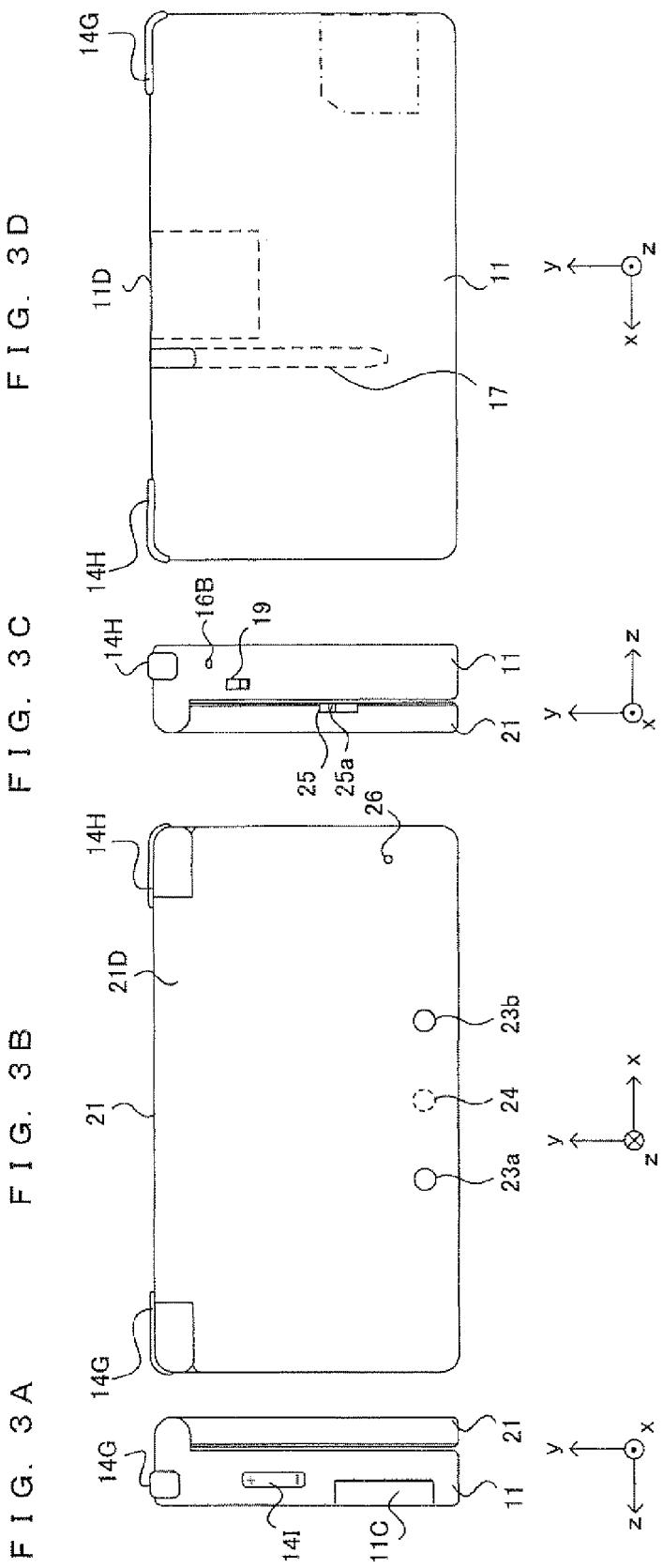
FIGS. 3A to 3D are a left side view, a front view, a right side view, and a rear view of the game apparatus 10 in its closed state, respectively.

FIG. 1 to FIG. 3 are each a plan view of an outer appearance of a game apparatus 10. The game apparatus 10 is a hand-held game apparatus, and is configured to be foldable as shown in FIG. 1 to FIG. 3. FIG. 1 and FIG. 2 show the game apparatus 10 in an opened state, and. FIG. 3 shows the game apparatus 10 in a closed state. FIG. 1 is a front view of the game apparatus 10 in the opened state, and FIG. 2 is a right side view of the game apparatus 10 in the opened state. The game apparatus 10 is able to take an image by means of an imaging section, display the taken image on a screen, and store data of the taken image. The game apparatus 10 can execute a game program which is stored in an exchangeable memory card or a game program which is received from a server or another game apparatus, and can display, on the screen, an image generated by computer graphics processing, such as an image taken by a virtual camera set in a virtual space, for example.

Initially, an external structure of the game apparatus 10 will be described with reference to FIG. 1 to FIG. 3. The game apparatus 10 includes a lower housing 11 and an upper housing 21 as shown in FIG. 1 to FIG. 3. The lower housing 11 and the upper housing 21 are connected to each other so as to be openable and closable (foldable). In the present embodiment, the lower housing 11 and the upper housing 21 are each formed in a horizontally long plate-like rectangular shape, and are connected to each other at long side portions thereof so as to be pivotable with respect to each other.

As shown in FIG. 1 and FIG. 2, projections 11A each of which projects in a direction orthogonal to an inner side surface (main surface) 11B of the lower housing 11 are provided at the upper long side portion of the lower housing 11, whereas a projection 21A which projects from the lower side surface of the upper housing 21 in a direction orthogonal to the lower side surface of the upper housing 21 is provided at the lower long side portion of the upper housing 21. Since the projections 11A of the lower housing 11 and the projection 21A of the upper housing 21 are connected to each other, the lower housing 11 and the upper housing 21 are foldably connected to each other.

(Description of Lower Housing)

Initially, a structure of the lower housing 11 will be described. As shown in FIG. 1 to FIG. 3, in the lower housing 11, a lower LCD (Liquid Crystal Display) 12, a touch panel 13, operation buttons 14A to 14L (FIG. 1, FIG. 3), an analog stick 15, an LED 16A and an LED 16B, an insertion opening 17, and a microphone hole 18 are provided. Hereinafter, these components will be described in detail.

As shown in FIG. 1, the lower LCD 12 is accommodated in the lower housing 11. The lower LCD 12 has a horizontally long shape, and is located such that a long side direction thereof corresponds to a long side direction of the lower housing 11. The lower LCD 12 is positioned at the center of the lower housing 11. The lower LCD 12 is provided on the inner side surface (main surface) of the lower housing 11, and a screen of the lower LCD 12 is exposed at an opening of the lower housing 11. When the game apparatus 10 is not used, the game apparatus 10 is in the closed state, thereby preventing the screen of the lower LCD 12 from becoming unclean and damaged. The number of pixels of the lower LCD 12 may be, for example, 256 dots×192 dots (the longitudinal line×the vertical line). The lower LCD 12 is a display device for displaying an image in a planar manner (not in a stereoscopically visible manner), which is different from the upper LCD 22 as described below. Although an LCD is used as a display device in the present embodiment, any other display device such as a display device using an EL (Electro Luminescence), or the like may be used. In addition, a display device having any resolution may be used as the lower LCD 12.

As shown in FIG. 1, the game apparatus 10 includes the touch panel 13 as an input device. The touch panel 13 is mounted on the screen of the lower LCD 12. In the present embodiment, the touch panel 13 may be, but is not limited to, a resistive film type touch panel. A touch panel of any type such as electrostatic capacitance type may be used. In the present embodiment, the touch panel 13 has the same resolution (detection accuracy) as that of the lower LCD 12. However, the resolution of the touch panel 13 and the resolution of the lower LCD 12 may not necessarily be the same. Further, the insertion opening 17 (indicated by dashed line in FIG. 1 and FIG. 3D) is provided on the upper side surface of the lower housing 11. The insertion opening 17 is used for accommodating a touch pen 28 which is used for performing an operation on the touch panel 13. Although an input on the touch panel 13 is usually made by using the touch pen 28, a finger of a user may be used for making an input on the touch panel 13, in addition to the touch pen 28.

The operation buttons 14A to 14L are each an input device for making a predetermined input. As shown in FIG. 1, among operation buttons 14A to 14L, a cross button 14A (a direction input button 14A), a button 14B, a button 14C, a button 14D, a button 14E, a power button 14F, a selection button 14J, a HOME button 14K, and a start button 14L are provided on the inner side surface (main surface) of the lower housing 11. The cross button 14A is cross-shaped, and includes buttons for indicating an upward, a downward, a leftward, or a rightward direction. The button 14B, button 14C, button 14D, and button 14E are positioned so as to form a cross shape. The button 14A to 14E, the selection button 14J, the HOME button 14K, and the start button 14L are assigned functions, respectively, in accordance with a program executed by the game apparatus 10, as necessary. For example, the cross button 14A is used for selection operation and the like, and the operation buttons 14B to 14E are used for, for example, determination operation and cancellation operation. The power button 14F is used for powering the game apparatus 10 on/off.

The analog stick 15 is a device for indicating a direction, and is provided to the left of the lower LCD 12 in an upper portion of the inner side surface of the lower housing 11. As shown in FIG. 1, the cross button 14A is provided to the left of the lower LCD12 in the lower portion of the lower housing 11. That is, the analog stick 15 is provided above the cross button 14A. The analog stick 15 and the cross button 14A are positioned so as to be operated by a thumb of a left hand with which the lower housing is held. Further, the analog stick 15 is provided in the upper area, and thus the analog stick 15 is positioned such that a thumb of a left hand with which the lower housing 11 is held is naturally positioned on the position of the analog stick 15, and the cross button 14A is positioned such that the thumb of the left hand is positioned on the position of the cross button 14A when the thumb of the left hand is slightly moved downward from the analog stick 15. The analog stick 15 has a top, corresponding to a key, which slides parallel to the inner side surface of the lower housing 11. The analog stick 15 acts in accordance with a program executed by the game apparatus 10. For example, when a game in which a predetermined object appears in a three-dimensional virtual space is executed by the game apparatus 10, the analog stick 15 acts as an input device for moving the predetermined object in the three-dimensional virtual space. In this case, the predetermined object is moved in a direction in which the top corresponding to the key of the analog stick 15 slides. As the analog stick 15, a component which enables an analog input by being tilted by a predetermined amount, in any direction, such as the upward, the downward, the rightward, the leftward, or the diagonal direction, may be used.

Four buttons, that is, the button 14B, the button 14C, the button 14D, and the button 14E, which are positioned so as to form a cross shape, are positioned such that a thumb of a right hand with which the lower housing 11 is held is naturally positioned on the positions of the four buttons. Further, the four buttons and the analog stick 15 sandwich the lower LCD 12, so as to be bilaterally symmetrical in position with respect to each other. Thus, depending on a game program, for example, a left-handed person can make a direction instruction input by using these four buttons.

Further, the microphone hole 18 is provided on the inner side surface of the lower housing 11. Under the microphone hole 18, a microphone (see FIG. 7) is provided as a sound input device described below, and the microphone detects for a sound from the outside of the game apparatus 10.

FIG. 3A is a left side view of the game apparatus 10 in the closed state. FIG. 3B is a front view of the game apparatus 10 in the closed state. FIG. 3C is a right side view of the game apparatus 10 in the closed state. FIG. 3D is a rear view of the game apparatus 10 in the closed state. As shown in FIG. 3B and FIG. 3D, an L button 14G and an R button 14H are provided on the upper side surface of the lower housing 11 The L button 14G is positioned on the left end portion of the upper side surface of the lower housing 11 and the R button 14H is positioned on the right end portion of the upper side surface of the lower housing 11. As described below, the L button 14G and the R button 14H act as shutter buttons (imaging instruction buttons) of the imaging section. Further, as shown in FIG. 3A, a sound volume button 14I is provided on the left side surface of the lower housing 11. The sound volume button 14I is used for adjusting a sound volume of a speaker of the game apparatus 10.

As shown in FIG. 3A, a cover section 11C is provided on the left side surface of the lower housing 11 so as to be openable and closable. Inside the cover section 11C, a connector (not shown) is provided for electrically connecting between the game apparatus 10 and an external data storage memory 45. The external data storage memory 45 is detachably connected to the connector. The external data storage memory 45 is used for, for example, recording (storing) data of an image taken by the game apparatus 10. The connector and the cover section 11C may be provided on the right side surface of the lower housing 11.

Further, as shown in FIG. 3D, an insertion opening 11D through which an external memory 44 having a game program stored therein is inserted is provided on the upper side surface of the lower housing 11. A connector (not shown) for electrically connecting between the game apparatus 10 and the external memory 44 in a detachable manner is provided inside the insertion opening 11D. A predetermined game program is executed by connecting the external memory 44 to the game apparatus 10. The connector and the insertion opening 11D may be provided on another side surface (for example, the right side surface) of the lower housing 11.

Further, as shown in FIG. 1 and FIG. 3C, a first LED 16A for notifying a user of an ON/OFF state of a power supply of the game apparatus 10 is provided on the lower side surface of the lower housing 11, and a second LED 16B for notifying a user of an establishment state of a wireless communication of the game apparatus 10 is provided on the right side surface of the lower housing 11. The game apparatus 10 can make wireless communication with other devices, and the second LED16B is lit up when the wireless communication is established. The game apparatus 10 has a function of connecting to a wireless LAN in a method based on, for example, IEEE802.11.b/g standard. A wireless switch 19 for enabling/disabling the function of the wireless communication is provided on the right side surface of the lower housing 11 (see FIG. 3C).

A rechargeable battery (not shown) acting as a power supply for the game apparatus 10 is accommodated in the lower housing 11, and the battery can be charged through a terminal provided on a side surface (for example, the upper side surface) of the lower housing 11.

(Description of Upper Housing)

Next, a structure of the upper housing 21 will be described. As shown in FIG. 1 to FIG. 3, in the upper housing 21, an upper LCD (Liquid Crystal Display) 22, an outer imaging section 23 (an outer imaging section (left) 23a and an outer imaging section (right) 23b), an inner imaging section 24, a 3D adjustment switch 25, and a 3D indicator 26 are provided. Hereinafter, theses components will be described in detail.

As shown in FIG. 1, the upper LCD 22 is accommodated in the upper housing 21. The upper LCD 22 has a horizontally long shape, and is located such that a long side direction thereof corresponds to a long side direction of the upper housing 21. The upper LCD 22 is positioned at the center of the upper housing 21. The area of a screen of the upper LCD 22 is set so as to be greater than the area of the screen of the lower LCD 12. Further, the screen of the upper LCD 22 is horizontally elongated as compared to the screen of the lower LCD 12. Specifically, a rate of the horizontal width in the aspect ratio of the screen of the upper LCD 22 is set so as to be greater than a rate of the horizontal width in the aspect ratio of the screen of the lower LCD 12.

Figure 4:
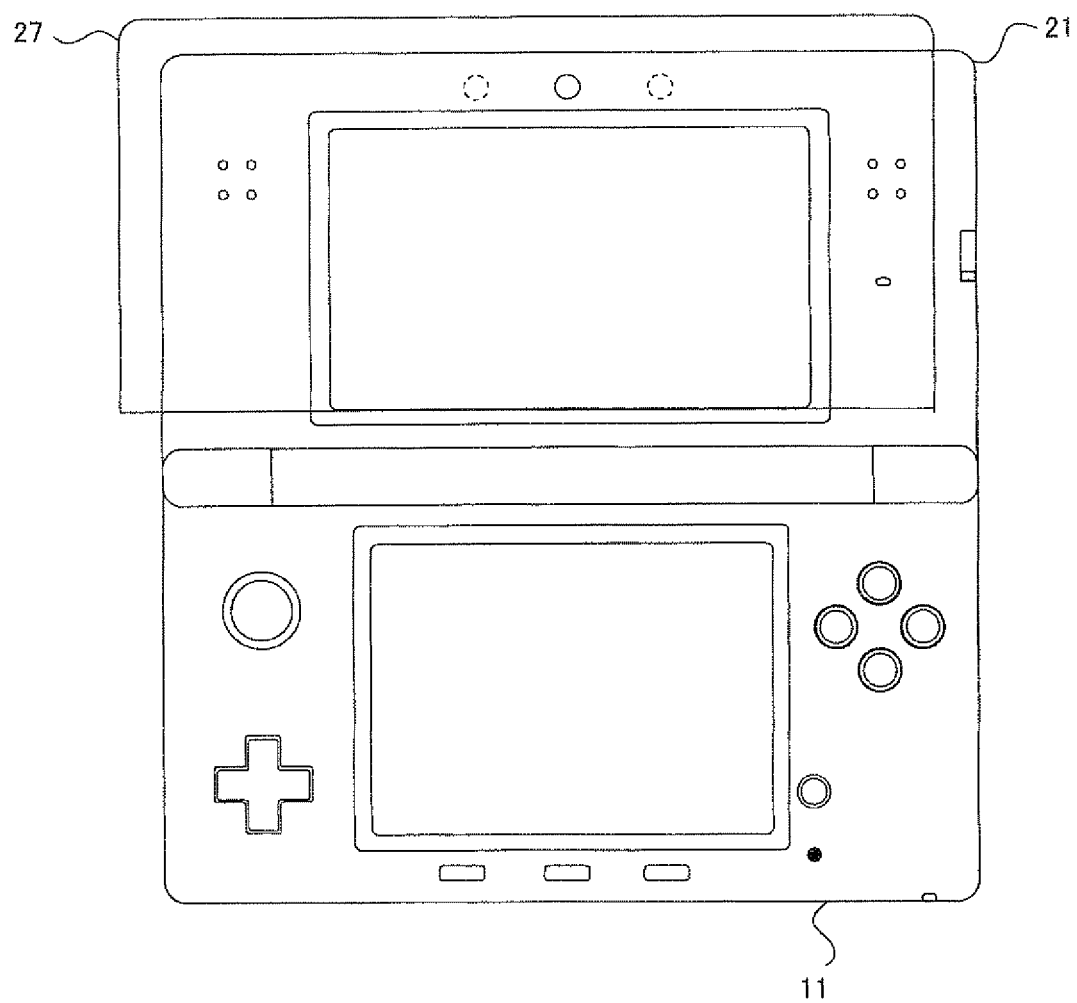
FIG. 4 is an exploded view illustrating a state in which a screen cover 27 is removed from an inner side surface of an upper housing 21.

The screen of the upper LCD 22 is provided on the inner side surface (main surface) 21B of the upper housing 21, and the screen of the upper LCD 22 is exposed at an opening of the upper housing 21. Further, as shown in FIG. 2 and FIG. 4, the inner side surface of the upper housing 21 is covered with a transparent screen cover 27. FIG. 4 is an exploded view illustrating a state in which the screen cover 27 is removed from the inner side surface of the upper housing 21. The screen cover 27 protects the screen of the upper LCD 22, and integrates the upper LCD 22 and the inner side surface of the upper housing 21 with each other, thereby achieving unity. The number of pixels of the upper LCD 22 may be, for example, 640 dots×200 dots (the horizontal line×the vertical line). Although, in the present embodiment, the upper LCD 22 is an LCD, a display device using an EL (Electro Luminescence), or the like may be used. In addition, a display device having any resolution may be used as the upper LCD 22.

The upper LCD 22 is a display device capable of displaying a stereoscopically visible image. Further, in the present embodiment, an image for a left eye and an image for a right eye are displayed by using substantially the same display area. Specifically, the upper LCD 22 may be a display device using a method in which the image for a left eye and the image for a right eye are alternately displayed in the horizontal direction in predetermined units (for example, every other line). Alternatively, a display device using a method in which the image for a left eye and the image for a right eye are alternately displayed for a predetermined time period may be used. Further, in the present embodiment, the upper LCD 22 is a display device capable of displaying an image which is stereoscopically visible with naked eyes. A lenticular lens type display device or a parallax barrier type display device is used which enables the image for a left eye and the image for a right eye, which are alternately displayed in the horizontal direction, to be separately viewed by the left eye and the right eye, respectively. In the present embodiment, the upper LCD 22 of a parallax barrier type is used. The upper LCD 22 displays, by using the image for a right eye and the image for a left eye, an image (a stereoscopic image) which is stereoscopically visible with naked eyes. That is, the upper LCD 22 allows a user to view the image for a left eye with her/his left eye, and the image for a right eye with her/his right eye by utilizing a parallax barrier, so that a stereoscopic image (a stereoscopically visible image) exerting a stereoscopic effect for a user can be displayed. Further, the upper LCD 22 may disable the parallax barrier. When the parallax barrier is disabled, an image can be displayed in a planar manner (it is possible to display a planar visible image which is different from a stereoscopically visible image as described above. Specifically, a display mode is used in which the same displayed image is viewed with a left eye and a right eye.). Thus, the upper LCD 22 is a display device capable of switching between a stereoscopic display mode for displaying a stereoscopically visible image and a planar display mode (for displaying a planar visible image) for displaying an image in a planar manner. The switching of the display mode is performed by the 3D adjustment switch 25 described below.

Two imaging sections (23a and 23b) provided on the outer side surface (the back surface reverse of the main surface on which the upper LCD 22 is provided) 21D of the upper housing 21 are generically referred to as the outer imaging section 23. The imaging directions of the outer imaging section (left) 23a and the outer imaging section (right) 23b are each the same as the outward normal direction of the outer side surface 21D. Further, these imaging sections are each designed so as to be positioned in a direction which is opposite to the normal direction of the display surface (inner side surface) of the upper LCD 22 by 180 degrees. Specifically, the imaging direction of the outer imaging section (left) 23a and the imaging direction of the outer imaging section (right) 23b are parallel to each other. The outer imaging section (left) 23a and the outer imaging section (right) 23b can be used as a stereo camera depending on a program executed by the game apparatus 10. Further, depending on a program, when any one of the two outer imaging sections (23a and 23b) is used alone, the outer imaging section 23 may be used as a non-stereo camera. Further, depending on a program, images taken by the two outer imaging sections (23a and 23b) may be combined with each other or may compensate for each other, thereby enabling imaging using an extended imaging range. In the present embodiment, the outer imaging section 23 is structured so as to include two imaging sections, that is, the outer imaging section (left) 23a and the outer imaging section (right) 23b. Each of the outer imaging section (left) 23a and the outer imaging section (right) 23b includes an imaging device, such as a CCD image sensor or a CMOS image sensor, having a common predetermined resolution, and a lens. The lens may have a zooming mechanism.

As indicated by dashed lines in FIG. 1 and by solid lines in FIG. 3B, the outer imaging section (left) 23a and the outer imaging section (right) 23b forming the outer imaging section 23 are aligned so as to be parallel to the horizontal direction of the screen of the upper LCD 22. Specifically, the outer imaging section (left) 23a and the outer imaging section (right) 23b are positioned such that a straight line connecting between the two imaging sections is parallel to the horizontal direction of the screen of the upper LCD 22. Reference numerals 23a and 23b which are indicated as dashed lines in FIG. 1 represent the outer imaging section (left) 23a and the outer imaging section (right) 23b, respectively, which are positioned on the outer side surface reverse of the inner side surface of the upper housing 21. As shown in FIG. 1, when a user views the screen of the upper LCD 22 from the front thereof, the outer imaging section (left) 23a is positioned to the left of the upper LCD 22 and the outer imaging section (right) 23b is positioned to the right of the upper LCD 22. When a program for causing the outer imaging section 23 to function as a stereo camera is executed, the outer imaging section (left) 23a takes an image for a left eye, which is viewed by a left eye of a user, and the outer imaging section (right) 23b takes an image for a right eye, which is viewed by a right eye of the user. A distance between the outer imaging section (left) 23a and the outer imaging section (right) 23b is set so as to be approximately the same as a distance between both eyes of a person, that is, may be set so as to be within a range from 30 mm to 70 mm, for example. However, the distance between the outer imaging section (left) 23a and the outer imaging section (right) 23b is not limited to a distance within the range described above.

In the present embodiment, the outer imaging section (left) 23a and the outer imaging section (right) 23b are secured to the housing, and the imaging directions thereof cannot be changed.

Further, the outer imaging section (left) 23a and the outer imaging section (right) 23b are positioned to the left and to the right, respectively, of the upper LCD 22 (on the left side and the right side, respectively, of the upper housing 21) so as to be horizontally symmetrical with respect to the center of the upper LCD 22. Specifically, the outer imaging section (left) 23a and the outer imaging section (right) 23b are positioned so as to be symmetrical with respect to a line which divides the upper LCD 22 into two equal parts, that is, the left part and the right part. Further, the outer imaging section (left) 23a and the outer imaging section (right) 23b are positioned at positions which are reverse of positions above the upper edge of the screen of the upper LCD 22 and which are on the upper portion of the upper housing 21 in an opened state. Specifically, when the upper LCD 22 is projected on the outer side surface of the upper housing 21, the outer imaging section (left) 23a and the outer imaging section (right) 23b are positioned, on the outer side surface of the upper housing 21, at a position above the upper edge of the screen of the upper LCD 22 having been projected.

As described above, the two imaging sections (23a and 23b) of the outer imaging section 23 are positioned to the left and the right of the upper LCD 22 so as to be horizontally symmetrical with respect to the center of the upper LCD 22. Therefore, when a user views the upper LCD 22 from the front thereof, the imaging direction of the outer imaging section 23 can be the same as the direction of the line of sight of the user. Further, the outer imaging section 23 is positioned at a position reverse of a position above the upper edge of the screen of the upper LCD 22. Therefore, the outer imaging section 23 and the upper LCD 22 do not interfere with each other inside the upper housing 21. Therefore, the upper housing 21 may have a reduced thickness as compared to a case where the outer imaging section 23 is positioned on a position reverse of a position of the screen of the upper LCD 22.

The inner imaging section 24 is positioned on the inner side surface (main surface) 21B of the upper housing 21, and acts as an imaging section which has an imaging direction which is the same direction as the inward normal direction of the inner side surface. The inner imaging section 24 includes an imaging device, such as a CCD image sensor and a CMOS image sensor, having a predetermined resolution, and a lens. The lens may have a zooming mechanism.

As shown in FIG. 1, when the upper housing 21 is in the opened state, the inner imaging section 24 is positioned, on the upper portion of the upper housing 21, above the upper edge of the screen of the upper LCD 22. Further, in this state, the inner imaging section 24 is positioned at the horizontal center of the upper housing 21 (on a line which separates the upper housing 21 (the screen of the upper LCD 22) into two equal parts, that is, the left part and the right part). Specifically, as shown in FIG. 1 and FIG. 3B, the inner imaging section 24 is positioned on the inner side surface of the upper housing 21 at a position reverse of the middle position between the left and the right imaging sections (the outer imaging section (left) 23a and the outer imaging section (right) 23b) of the outer imaging section 23. Specifically, when the left and the right imaging sections of the outer imaging section 23 provided on the outer side surface of the upper housing 21 are projected on the inner side surface of the upper housing 21, the inner imaging section 24 is positioned at the middle position between the left and the right imaging sections having been projected. The dashed line 24 indicated in FIG. 3B represents the inner imaging section 24 positioned on the inner side surface of the upper housing 21.

As described above, the inner imaging section 24 is used for taking an image in the direction opposite to that of the outer imaging section 23. The inner imaging section 24 is positioned on the inner side surface of the upper housing 21 at a position reverse of the middle position between the left and the right imaging sections of the outer imaging section 23. Thus, when a user views the upper LCD 22 from the front thereof, the inner imaging section 24 can take an image of a face of the user from the front thereof. Further, the left and the right imaging sections of the outer imaging section 23 do not interfere with the inner imaging section 24 inside the upper housing 21, thereby enabling reduction of the thickness of the upper housing 21.

The 3D adjustment switch 25 is a slide switch, and is used for switching a display mode of the upper LCD 22 as described above. Further, the 3D adjustment switch 25 is used for adjusting the stereoscopic effect of a stereoscopically visible image (stereoscopic image) which is displayed on the upper LCD 22. As shown in FIG. 1 to FIG. 3, the 3D adjustment switch 25 is provided at the end portions of the inner side surface and the right side surface of the upper housing 21, and is positioned at a position at which the 3D adjustment switch 25 is visible to a user when the user views the upper LCD 22 from the front thereof. Further, an operation section of the 3D adjustment switch 25 projects on the inner side surface and the right side surface, and can be viewed and operated from both sides. All the switches other than the 3D adjustment switch 25 are provided on the lower housing 11.

Figure 5:
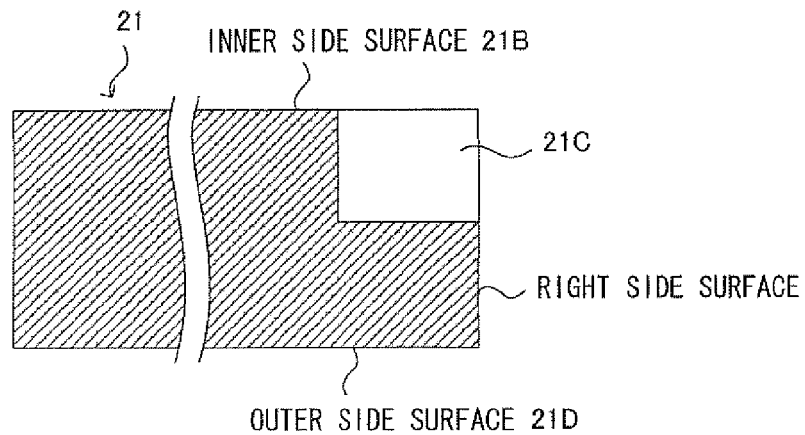
FIG. 5 is a cross-sectional view of an upper housing 21 shown in FIG. 1 taken along a line A-A'.

FIG. 5 is a cross-sectional view of the upper housing 21 shown in FIG. 1 taken along a line A-A'. As shown in FIG. 5, a recessed portion 21C is formed at the right end portion of the inner side surface of the upper housing 21, and the 3D adjustment switch 25 is provided in the recessed portion 21C. The 3D adjustment switch 25 is provided so as to be visible from the front surface and the right side surface of the upper housing 21 as shown in FIG. 1 and FIG. 2. A slider 25a of the 3D adjustment switch 25 is slidable to any position in a predetermined direction (along the longitudinal direction of the right side surface), and a display mode of the upper LCD 22 is determined in accordance with the position of the slider 25a.

Figure 6A:
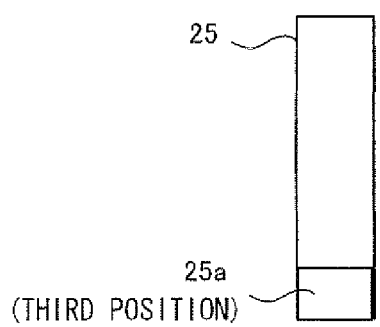
FIG. 6A is a diagram illustrating a state in which a slider 25a of a 3D adjustment switch 25 is positioned at the lowermost position (a third position)
Figure 6B:
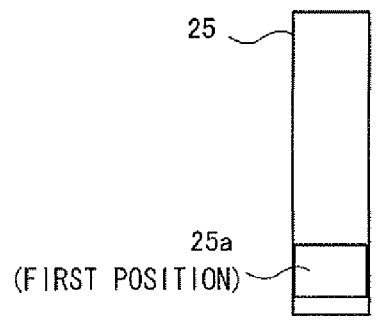
FIG. 6B is a diagram illustrating a state in which the slider 25a of the 3D adjustment switch 25 is positioned above the lowermost position (a first position)
Figure 6C:
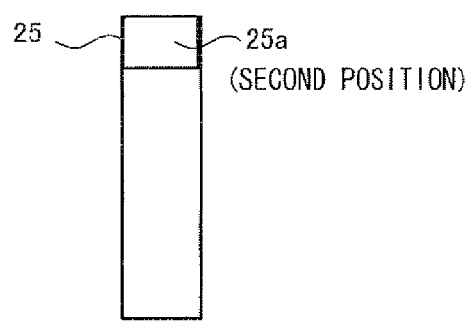
FIG. 6C is a diagram illustrating a state in which the slider 25a of the 3D adjustment switch 25 is positioned at the uppermost position (a second position)

FIG. 6A to FIG. 6C are each a diagram illustrating a state in which the slider 25a of the 3D adjustment switch 25 slides. FIG. 6A is a diagram illustrating a state in which the slider 25a of the 3D adjustment switch 25 is positioned at the lowermost position (a third position). FIG. 6B is a diagram illustrating a state in which the slider 25a of the 3D adjustment switch 25 is positioned above the lowermost position (a first position). FIG. 6C is a diagram illustrating a state in which the slider 25a of the 3D adjustment switch 25 is positioned at the uppermost position (a second position).

As shown in FIG. 6A, when the slider 25a of the 3D adjustment switch 25 is positioned at the lowermost position (the third position), the upper LCD 22 is set to the planar display mode, and a planar image is displayed on the screen of the upper LCD 22 (the upper LCD 22 may remain set to the stereoscopic display mode, and the same image may be used for the image for a left eye and the image for a right eye, to perform planar display). On the other hand, when the slider 25a is positioned between a position shown in FIG. 6B (a position (first position) above the lowermost position) and a position shown in FIG. 6C (the uppermost position (the second position)), the upper LCD 22 is set to the stereoscopic display mode. In this case, a stereoscopically visible image is displayed on the screen of the upper LCD 22. When the slider 25a is positioned between the first position and the second position, a manner in which the stereoscopic image is visible is adjusted in accordance with the position of the slider 25a. Specifically, an amount of deviation in the horizontal direction between a position of an image for a right eye and a position of an image for a left eye is adjusted in accordance with the position of the slider 25a. An adjustment for a manner in which a stereoscopic image is visible in the stereoscopic display mode will be described below. The slider 25a of the 3D adjustment switch 25 is configured so as to be fixed at the third position, and is slidable, along the longitudinal direction of the right side surface, to any position between the first position and the second position. For example, the slider 25a is fixed at the third position by a projection (not shown) which projects, from the side surface of the 3D adjustment switch 25, in the lateral direction shown in FIG. 6A, and does not slide upward from the third position unless a predetermined force or a force greater than the predetermined force is applied upward. When the slider 25a is positioned between the third position and the first position, the manner in which the stereoscopic image is visible is not adjusted, which is intended as a margin. In another embodiment, the third position and the first position may be the same position, and, in this case, no margin is provided. Further, the third position may be provided between the first position and the second position. In this case, a direction in which an amount of deviation in the horizontal direction between a position of an image for a right eye and a position of an image for a left eye is adjusted when the slider is moved from the third position toward the first position, is opposite to a direction in which an amount of deviation in the horizontal direction between the position of the image for the right eye and the position of the image for the left eye is adjusted when the slider is moved from the third position toward the second position.

The program executed by the game apparatus according to the present embodiment includes a program for displaying a stereoscopic photograph, and a program for displaying a stereoscopic CG image. The program for displaying a stereoscopic CG image is used for taking an image of a virtual space by means of a virtual camera for a left eye and a virtual camera for a right eye to generate an image for the left eye and an image for the right eye. The game apparatus according to the present embodiment adjusts the stereoscopic effect by changing a distance between the two virtual cameras in accordance with the position of the slider 25a of the 3D adjustment switch 25 when executing such a program.

The 3D indicator 26 indicates whether or not the upper LCD 22 is in the stereoscopic display mode. The 3D indicator 26 is implemented as a LED, and is lit up when the stereoscopic display mode of the upper LCD 22 is enabled. The 3D indicator 26 may be lit up only when the program processing for displaying a stereoscopically visible image is performed (namely, image processing in which an image for a left eye is different from an image for a right eye is performed in the case of the 3D adjustment switch being positioned between the first position and the second position) in a state where the upper LCD 22 is in the stereoscopic display mode. As shown in FIG. 1, the 3D indicator 26 is positioned near the screen of the upper LCD 22 on the inner side surface of the upper housing 21. Therefore, when a user views the screen of the upper LCD 22 from the front thereof, the user can easily view the 3D indicator 26. Therefore, also when a user is viewing the screen of the upper LCD 22, the user can easily recognize the display mode of the upper LCD 22.

Further, a speaker hole 21E is provided on the inner side surface of the upper housing 21. A sound is outputted through the speaker hole 21E from a speaker 43 described below.

(Internal Configuration of Game Apparatus 10)

Figure 7:
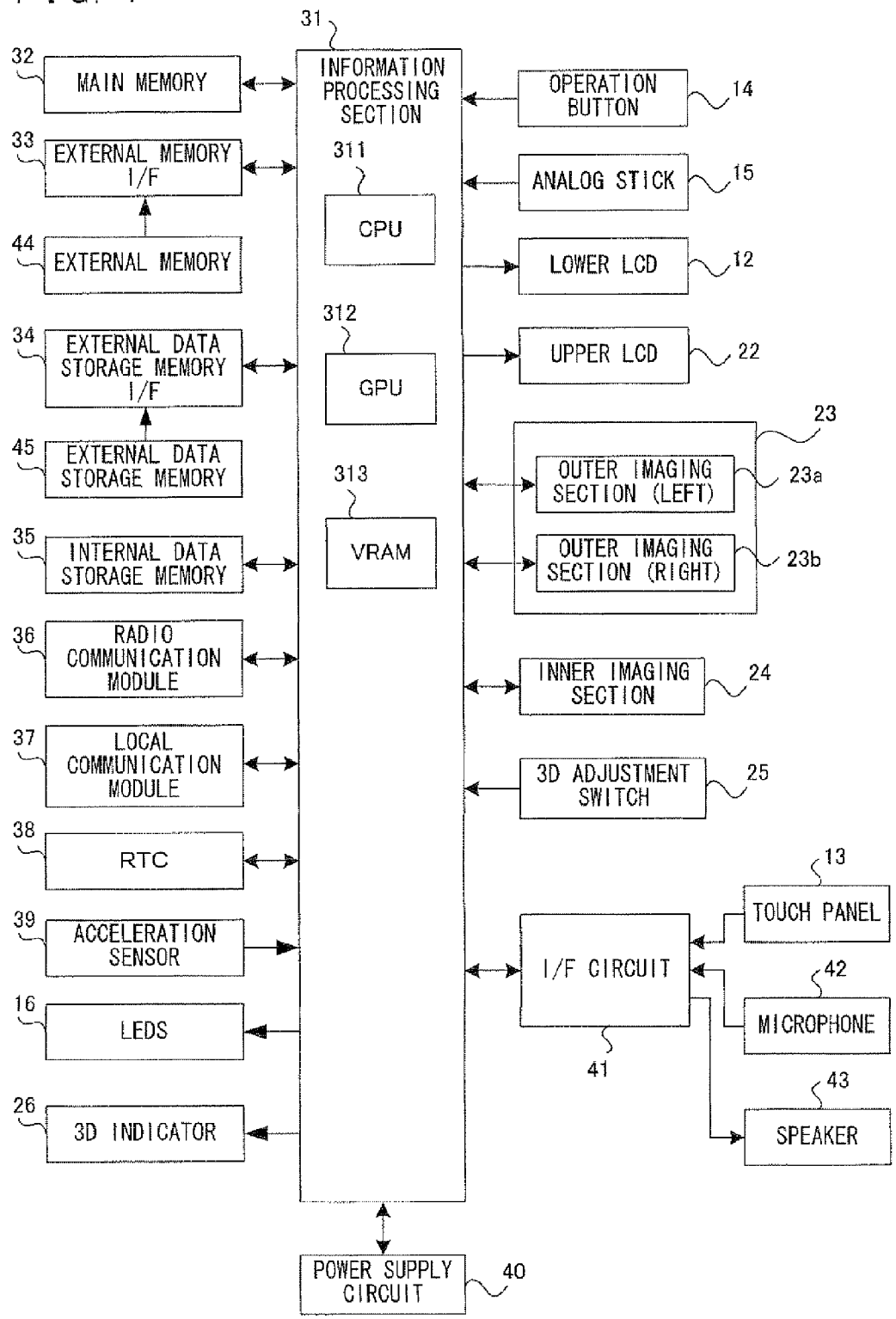
FIG. 7 is a block diagram illustrating an internal configuration of the game apparatus 10.

Next, an internal electrical configuration of the game apparatus 10 will be described with reference to FIG. 7. FIG. 7 is a block diagram illustrating an internal configuration of the game apparatus 10. As shown in FIG. 7, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a local communication module 37, a real-time clock (RTC) 38, an acceleration sensor 39, a power supply circuit 40, an interface circuit (I/F circuit) 41, and the like. These electronic components are mounted on an electronic circuit substrate, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. In the present embodiment, a predetermined program is stored in a memory (for example, the external memory 44 connected to the external memory I/F 33 or the internal data storage memory 35) inside the game apparatus 10. The CPU 311 of the information processing section 31 executes a hand-drawn object display process (FIG. 9) described below by executing the predetermined program. The program executed by the CPU 311 of the information processing section 31 may be acquired from another device through communication with the other device. The information processing section 31 further includes a VRAM (Video RAM) 313. The GPU 312 of the information processing section 31 generates an image in accordance with an instruction from the CPU 311 of the information processing section 31, and renders the image in the VRAM 313. The GPU 312 of the information processing section 31 outputs the image rendered in the VRAM 313, to the upper LCD 22 and/or the lower LCD 12, and the image is displayed on the upper LCD 22 and/or the lower LCD 12. In the present embodiment, the VRAM 313 includes a storage area for the lower LCD 12 (hereinafter, referred to as a touch panel VRAM) and a storage area for the upper LCD 22 (hereinafter, referred to as a texture VRAM).

To the information processing section 31, the main memory 32, the external memory I/F 33, the external data storage memory I/F 34, and the internal data storage memory 35 are connected. The external memory I/F 33 is an interface for detachably connecting to the external memory 44. The external data storage memory I/F 34 is an interface for detachably connecting to the external data storage memory 45.

The main memory 32 is volatile storage means used as a work area and a buffer area for (the CPU 311 of) the information processing section 31. That is, the main memory 32 temporarily stores various types of data used for the hand-drawn object display process, and temporarily stores a program acquired from the outside (the external memory 44, another device, or the like), for example. In the present embodiment, for example, a PSRAM (Pseudo-SRAM) is used as the main memory 32.

The external memory 44 is nonvolatile storage means for storing a program executed by the information processing section 31. The external memory 44 is implemented as, for example, a read-only semiconductor memory. When the external memory 44 is connected to the external memory I/F 33, the information processing section 31 can load a program stored in the external memory 44. A predetermined process is performed by the program loaded by the information processing section 31 being executed. The external data storage memory 45 is implemented as a non-volatile readable and writable memory (for example, a NAND flash memory), and is used for storing predetermined data. For example, images taken by the outer imaging section 23 and/or images taken by another device are stored in the external data storage memory 45. When the external data storage memory 45 is connected to the external data storage memory I/F 34, the information processing section 31 loads an image stored in the external data storage memory 45, and the image can be displayed on the upper LCD 22 and/or the lower LCD 12.

The internal data storage memory 35 is implemented as a non-volatile readable and writable memory (for example, a NAND flash memory), and is used for storing predetermined data. For example, data and/or programs downloaded through the wireless communication module 36 by wireless communication is stored in the internal data storage memory 35.

The wireless communication module 36 has a function of connecting to a wireless LAN by using a method based on, for example, IEEE 802.11.b/g standard. The local communication module 37 has a function of performing wireless communication with the same type of game apparatus in a predetermined communication method (for example, infrared communication). The wireless communication module 36 and the local communication module 37 are connected to the information processing section 31. The information processing section 31 can perform data transmission to and data reception from another device via the Internet by using the wireless communication module 36, and can perform data transmission to and data reception from the same type of another game apparatus by using the local communication module 37.

The acceleration sensor 39 is connected to the information processing section 31. The acceleration sensor 39 detects magnitudes of accelerations (linear accelerations) in the directions of the straight lines along the three axial (xyz axial) directions, respectively. The acceleration sensor 39 is provided inside the lower housing 11. In the acceleration sensor 39, as shown in FIG. 1, the long side direction of the lower housing 11 is defined as x axial direction, the short side direction of the lower housing 11 is defined as y axial direction, and the direction orthogonal to the inner side surface (main surface) of the lower housing 11 is defined as z axial direction, thereby detecting magnitudes of the linear accelerations for the respective axes. The acceleration sensor 39 is, for example, an electrostatic capacitance type acceleration sensor. However, another type of acceleration sensor may be used. The acceleration sensor 39 may be an acceleration sensor for detecting a magnitude of an acceleration for one axial direction or two-axial directions. The information processing section 31 can receive data (acceleration data) representing accelerations detected by the acceleration sensor 39, and detect an orientation and a motion of the game apparatus 10.

The RTC 38 and the power supply circuit 40 are connected to the information processing section 31. The RTC 38 counts time, and outputs the time to the information processing section 31. The information processing section 31 calculates a current time (date) based on the time counted by the RTC 38. The power supply circuit 40 controls power from the power supply (the rechargeable battery accommodated in the lower housing 11 as described above) of the game apparatus 10, and supplies power to each component of the game apparatus 10.

The I/F circuit 41 is connected to the information processing section 31. The microphone 42 and the speaker 43 are connected to the I/F circuit 41. Specifically, the speaker 43 is connected to the I/F circuit 41 through an amplifier which is not shown. The microphone 42 detects a voice from a user, and outputs a sound signal to the I/F circuit 41. The amplifier amplifies a sound signal outputted from the I/F circuit 41, and a sound is outputted from the speaker 43. The touch panel 13 is connected to the I/F circuit 41. The I/F circuit 41 includes a sound control circuit for controlling the microphone 42 and the speaker 43 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data based on a signal outputted from the touch panel 13, and outputs the touch position data to the information processing section 31. The touch position data represents a coordinate of a position, on an input surface of the touch panel 13, on which an input is made. The touch panel control circuit reads a signal outputted from the touch panel 13, and generates the touch position data every predetermined time. The information processing section 31 acquires the touch position data, to recognize a position on which an input is made on the touch panel 13.

The operation button 14 includes the operation buttons 14A to 14L described above, and is connected to the information processing section 31. Operation data representing an input state of each of the operation buttons 14A to 14I is outputted from the operation button 14 to the information processing section 31, and the input state indicates whether or not each of the operation buttons 14A to 14I has been pressed. The information processing section 31 acquires the operation data from the operation button 14 to perform a process in accordance with the input on the operation button 14.

The lower LCD 12 and the upper LCD 22 are connected to the information processing section 31. The lower LCD 12 and the upper LCD 22 each display an image in accordance with an instruction from (the GPU 312 of) the information processing section 31. In the present embodiment, the information processing section 31 causes the lower LCD 12 to display an image for operation, and causes the upper LCD 22 to display an image acquired from one of the imaging sections 23 or 24. That is, the information processing section 31 causes the upper LCD 22 to display a stereoscopic image (stereoscopically visible image) using an image for a right eye and an image for a left eye which are taken by the outer imaging section 23, and causes the upper LCD 22 to display a planar image taken by the inner imaging section 24, for example.

Specifically, the information processing section 31 is connected to an LCD controller (not shown) of the upper LCD 22, and causes the LCD controller to set the parallax barrier to ON or OFF. When the parallax barrier is set to ON in the upper LCD 22, an image for a right eye and an image for a left eye, (taken by the outer imaging section 23), which are stored in the VRAM 313 of the information processing section 31 are outputted to the upper LCD 22. More specifically, the LCD controller alternately repeats reading of pixel data of the image for a right eye for one line in the vertical direction, and reading of pixel data of the image for a left eye for one line in the vertical direction, thereby reading, from the VRAM 313, the image for a right eye and the image for a left eye. Thus, an image to be displayed is divided into the images for a right eye and the images for a left eye each of which is a rectangle-shaped image having one line of pixels aligned in the vertical direction, and an image, in which the rectangle-shaped image for the left eye which is obtained through the division, and the rectangle-shaped image for the right eye which is obtained through the division are alternately aligned, is displayed on the screen of the upper LCD 22. A user views the images through the parallax barrier in the upper LCD 22, so that the image for the right eye is viewed by the user's right eye, and the image for the left eye is viewed by the user's left eye. Thus, the stereoscopically visible image is displayed on the screen of the upper LCD 22.

The outer imaging section 23 and the inner imaging section 24 are connected to the information processing section 31. The outer imaging section 23 and the inner imaging section 24 each take an image in accordance with an instruction from the information processing section 31, and output data of the taken image to the information processing section 31. In the present embodiment, the information processing section 31 issues an instruction for taking an image to one of the outer imaging section 23 or the inner imaging section 24, and the imaging section which receives the instruction for taking an image takes an image and transmits data of the taken image to the information processing section 31. Specifically, in the present embodiment, a user selects the imaging section to be used through a touch operation using the touch panel 13. When the information processing section 31 (the CPU 311) detects that the imaging section is selected, the information processing section 31 instructs one of the outer imaging section 32 or the inner imaging section 24 to take an image.

The 3D adjustment switch 25 is connected to the information processing section 31. The 3D adjustment switch 25 transmits, to the information processing section 31, an electrical signal in accordance with the position of the slider 25a.

The 3D indicator 26 is connected to the information processing section 31. The information processing section 31 controls whether or not the 3D indicator 26 is to be lit up. In the present embodiment, the information processing section 31 lights up the 3D indicator 26 when the upper LCD 22 is in the stereoscopic display mode. The game apparatus 10 has the internal configuration as described above.

(Details of Hand-drawn Object Display Process)

Figure 8:
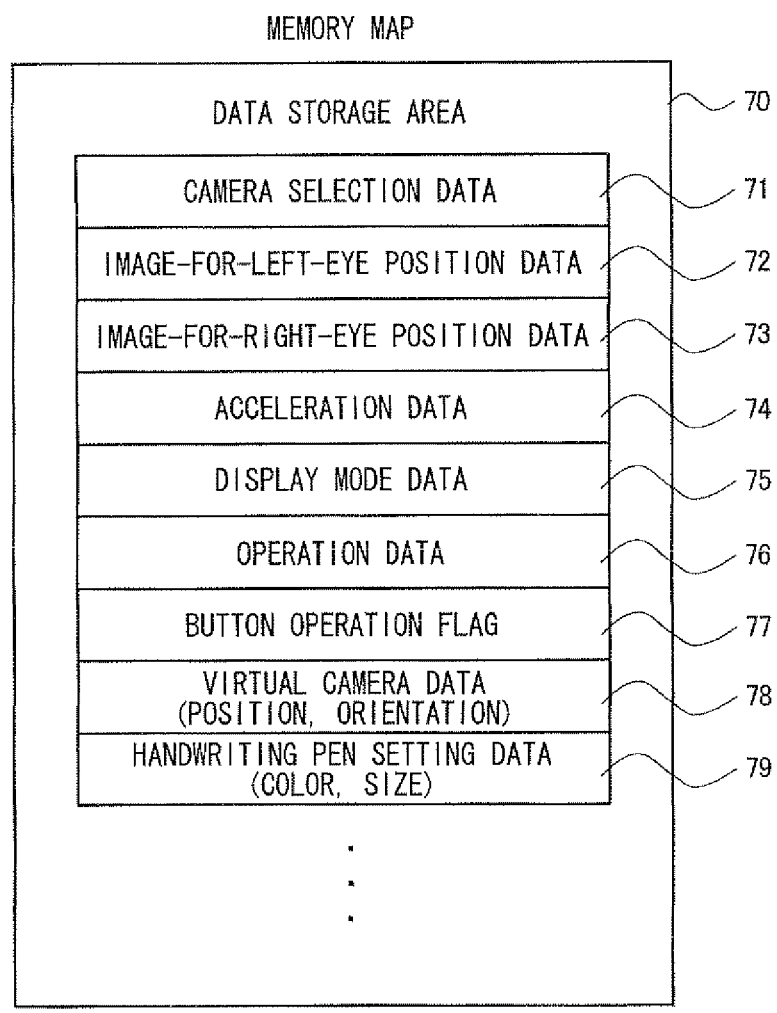
FIG. 8 is a diagram illustrating a memory map of a main memory 32 in the game apparatus 10.

Next, with reference to FIGS. 8 to 11, the hand-drawn object display process according to the present embodiment will be described in detail. First of all, main data stored in the main memory 32 when performing the hand-drawn object display process will be described. FIG. 8 is a diagram illustrating a memory map of the main memory 32 in the game apparatus 10. As shown in FIG. 8, a data storage area 70 is provided in the main memory 32. In the data storage area 70, camera selection data 71, image-for-left-eye position data 72, image-for-right-eye position data 73, acceleration data 74, display mode data 75, operation data 76, button operation flag 77, virtual camera data (position, orientation) 78, and hand-drawing pen setting data 79, and the like are stored in the main memory 32. In addition to these data, a program for executing the above-described imaging process, data indicating a touch position on the touch panel 13, data indicating an image for camera selection which is displayed on the lower LCD 12, manually inputted image data which is displayed on the lower LCD 12, and the like are stored in the main memory 32. Hereinafter, the "imaging section" is sometimes referred to as a "camera".

The camera selection data 71 indicates an imaging section which is currently selected. The camera selection data 71 indicates whether the currently selected imaging section is the outer imaging section 23 or the inner imaging section 24.

The image-for-left-eye position data 72 indicates a display position, on the upper LCD 22, of an image for a left eye, which is captured by the outer imaging section (left) 23a, and indicates coordinates of an image center of the image for the left eye. The right-eye image position data 73 indicates a display position, on the upper LCD 22, of an image for a right eye, which is captured by the outer imaging section (right) 23b, and indicates coordinates of an image center of the image for the right eye.

The acceleration data 74 indicates a latest acceleration detected by the acceleration sensor 39. Specifically, the acceleration data 74 indicates accelerations in the x-, y-, and z-axes directions which are detected by the acceleration sensor 39. The acceleration sensor 39 detects an acceleration once every predetermined period, and transmits the detected acceleration to the information processing section 31 (CPU 311). The information processing section 31 updates the acceleration data 74 in the main memory 32 every time the acceleration sensor 39 detects an acceleration.

The display mode data 75 indicates whether the display mode of the upper LCD 22 is the stereoscopic display mode or the planar display mode.

The operation data 76 indicates operations performed on the respective operation buttons 14A to 14E and 14G to 14H, and the analog stick 15.

The button operation flag 77 is data of two values. The button operation flag 77 is updated and stored when any of the operation buttons 14B to 14E is pressed at a predetermined timing. If the operation button 14B is pressed when "0" (OFF) is stored as the button operation flag 77, the button operation flag 77 is updated from "0" (OFF) to "1" (ON) and stored. In the following description, the button operated state is stored as "1" (ON), while the button non-operated state is stored as "0" (OFF). However, another operation button may be used, and a flag of another mode (other than "0" and "1") may be used.

The virtual camera data 78 includes position data and orientation data of a virtual camera in a marker coordinate system, which are calculated based on a marker recognition result described later.

The hand-drawing pen setting data 79 indicates the color and the size of the touch pen 28 when a hand-drawn object is input to the touch panel 13 using the touch pen 28. Initial values (e.g., "black" and "heavy line") are previously stored. When the cursor moves in response to a user's operation on the cross button 14A and selects a color designating icon or a size designating icon, it is determined that the user requests to change the color or the size of the touch pen 28, and the color or the size of the touch pen 28 is changed according to the user's request. The color or the size of the touch pen 28 having been changed is stored as the hand-drawing pen setting data 79.

Figure 9:
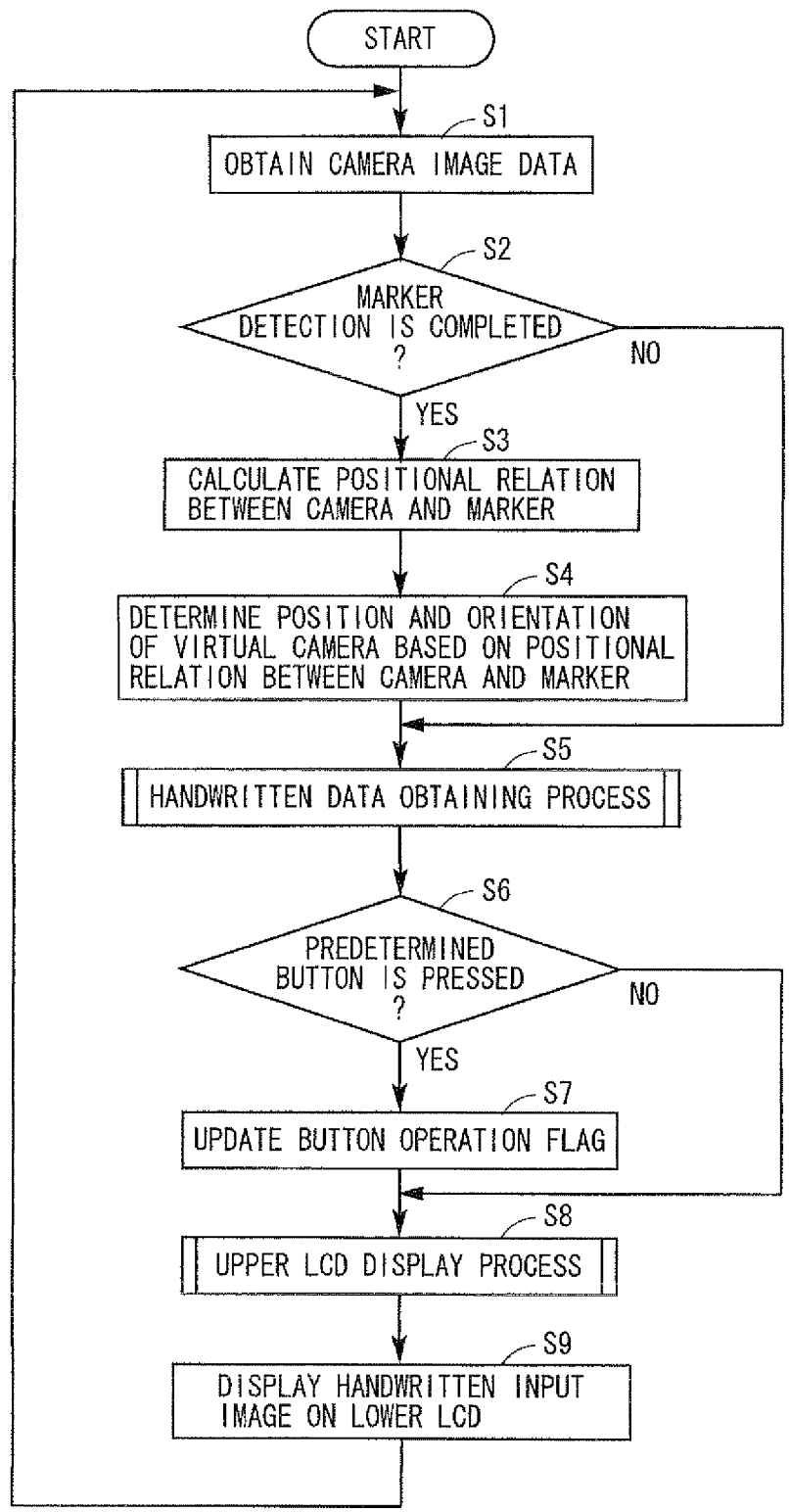
FIG. 9 is a main flowchart illustrating in detail a hand-drawn object display process of the present invention.

Next, the hand-drawn object display process will be described in detail with reference to FIGS. 9 to 11. FIG. 9 is a main flowchart illustrating the hand-drawn object display process of the present embodiment. When a game apparatus 10 is powered on, the information processing section 31 (CPU 311) of the game apparatus 10 executes a start-up program stored in a ROM (not shown), and thereby the respective units such as the main memory 32 are initialized. Next, a hand-drawn object display process program stored in the internal data storage memory 35 is read into the main memory 32, and the CPU 311 in the information processing section 31 starts execution of the program.

Figure 10:
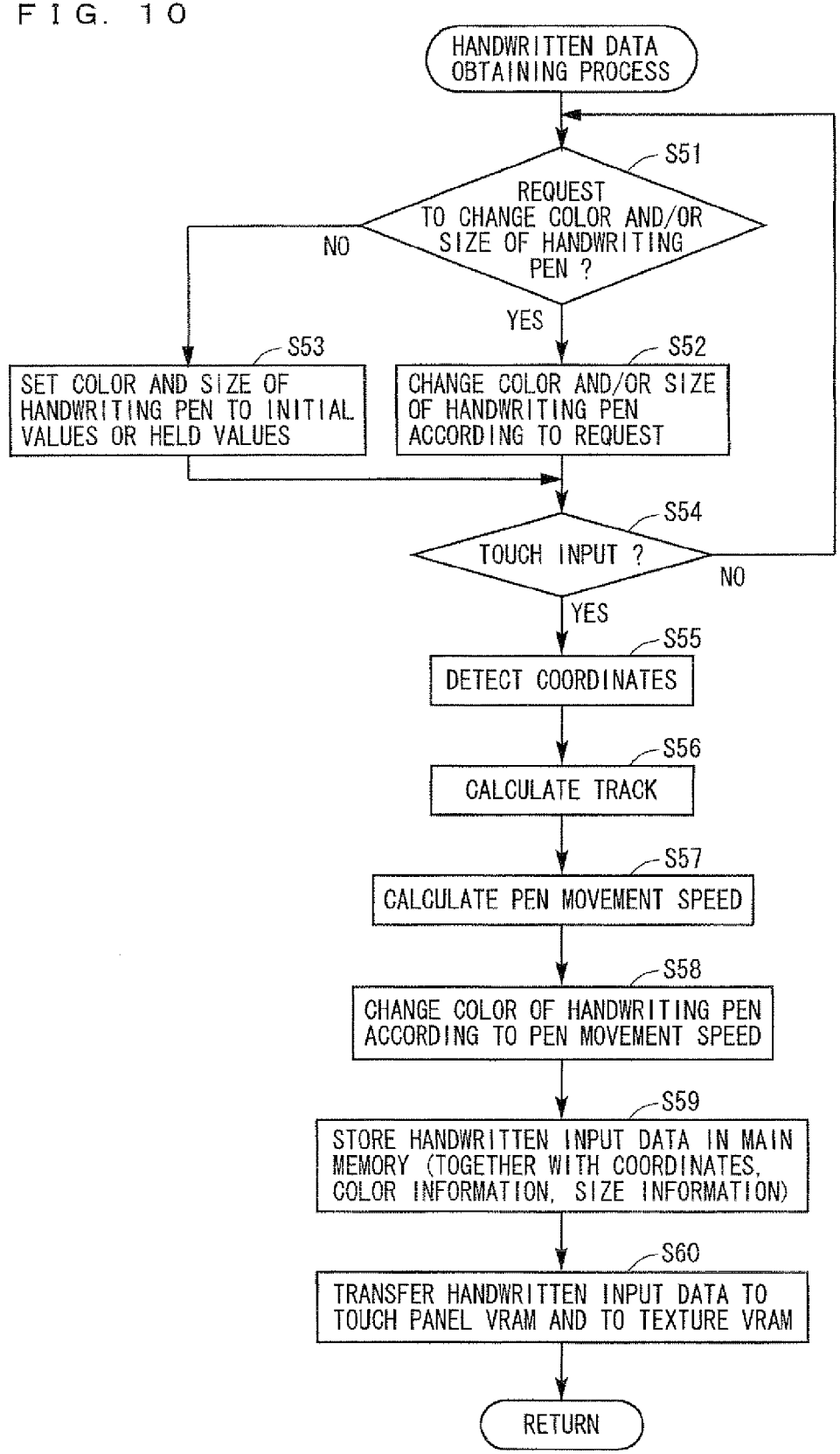
FIG. 10 is a flowchart illustrating in detail a hand-drawn data obtaining process (step S5) in a lower LCD 12.

A flowchart shown in FIG. 10 illustrates, in detail, a hand-drawn data obtaining process (step S5) shown in FIG. 9. A flowchart shown in FIG. 11 illustrates, in detail, an upper LCD display process (step S8) shown in FIG. 9. A process loop including steps S1 to S9 shown in FIG. 9 is repeatedly executed in every frame period (e.g., 1/30 sec.). In the following description, it is assumed that the outer imaging section 23 is selected, and the stereoscopic display mode is selected. The present invention is applicable not only to the stereoscopic display mode but also to the planar display mode. When setting is changed so as to perform only one of a process for a right eye and a process for a left eye in the stereoscopic display mode described below, a process in the planar display mode is achieved.

Initially, a main routine of the hand-drawn object display process will be described with reference to FIG. 9. In step S1, the information processing section 31 obtains the camera image data. Specifically, the information processing section 31 obtains image data indicating an image captured by the currently selected camera, and stores the image data in the VRAM 313. Since the outer imaging section 23 is selected, the information processing section 31 obtains image data for a right eye and image data for a left eye indicating an image for the right eye and an image for the left eye, respectively, which are captured by the outer imaging section 23.

In step S2, the information processing section 31 determines, based on the obtained camera image data, whether a marker is detected from the image captured by the outer imaging section 23. The marker is a Roman letter "M" which is white-outlined in a black quadrangle which is printed in the center of a white slip. However, the shape, the pattern, and the color of the marker are not limited to those described above. Any marker may be used so long as the position (the positions of four points) of the marker and the orientation of the marker can be recognized. Specifically, the information processing section 31 initially extracts a region, which is encloses by four line segments, from the image captured by the outer imaging section 23, and obtains a pattern image inside the extracted region. Then, the information processing section 31 calculates the degree of similarity of pattern image data indicating the obtained pattern image to pattern image data previously stored in the external memory 44. When a value indicating the degree of similarity, which is obtained as a result of calculation, is equal to or greater than a predetermined threshold value (YES in step S2), the process goes to step S3. When the value indicating the degree of similarity is smaller than the threshold value (NO in step S2), the process goes to step S5.

In step S3, the information processing section 31 calculates, based on the result of marker detection, a positional relation between the outer imaging section 23 (the game apparatus 10) and the marker. For example, the positional relation is expressed as, when one of the outer imaging section 23 and the marker is a reference, three-dimensional position and orientation of the other. The calculation of the positional relation is realized by a process similar to that in the conventional augmented reality technology.

In step S4, the information processing section 31 determines the position and orientation of the virtual camera, based on the positional relation between the outer imaging section 23 and the marker. At this time, since the stereoscopic display mode is selected, the information processing section 31 calculates the position and orientation of the virtual camera for a left eye, based on the camera image data obtained by the outer imaging section (left) 23a, and calculates the position and orientation of the virtual camera for a right eye, based on the camera image data obtained by the outer imaging section (right) 23b. The position and orientation of the virtual camera are obtained by using a view matrix of the virtual camera, which is obtained from the positional relation between the outer imaging section 23 and the marker. The determined position and orientation of the virtual camera are stored as the virtual camera data 78 in the data storage area 70 in the main memory 32.

In step S5, the information processing section 31 execute the hand-drawn data obtaining process. The hand-drawn data obtaining process in step S5 is subroutined, and the details thereof will be described later.

In step S6, the information processing section 31 determines whether a predetermined button is pressed. At this time, if the user presses, for example, the operation button 14B, the information processing section 31 determines that the predetermined button is pressed. When the information processing section 31 determines that the predetermined button is pressed (YES in step S6), the process goes to step S7. Otherwise (NO in step S6), the process goes to step S8. The predetermined button is not limited to the operation button 14B. The predetermined button may be another operation button, or another event. An example of an event is end of hand-drawing by the user (no touch input to the touch panel 13 for a predetermined period).

In step S7, the information processing section 31 updates the button operation flag 77. At this time, as described above, every time the operation button 14B is pressed, "0" is changed to "1" or "1" is changed to "0", thereby updating the button operation flag 77.

In step S8, the information processing section 31 executes an upper LCD display process. The upper LCD display process in step S8 is subroutined, and the details thereof will be described later.

In step S9, the information processing section 31 displays a hand-drawn input image on the lower LCD 12. At this time, the information processing section 31 displays the hand-drawn input image on the lower LCD 12, based on the hand-drawn input data stored in the touch panel VRAM.

Next, with reference to FIG. 10, the subroutine of the hand-drawn data obtaining process will be described. In step S51, the information processing section 31 determines whether a request to change the color and/or the size of the hand-drawing pen is inputted by the user. When it is determined that a request to change the color and/or the size of the hand-drawing pen is inputted (YES in step S51), the process goes to step S52. Otherwise (NO in step S51), the process goes to step S53.

In step S52, the information processing section 31 changes the color and/or the size of the hand-drawing pen in accordance with the user's request. The color and/or the size of the hand-drawing pen having been changed are stored as the hand-drawing pen setting data 79 in the data storage area 70 in the main memory 32. Thereafter, the process goes to step S54.

In step S53, the information processing section 31 reads the hand-drawing pen setting data 79 from the data storage area 70 in the main memory 32, and sets the color and/or the size of the hand-drawing pen. At this time, the color and/or the size of the hand-drawing pen are set to the initial values or held values, which have been stored as the hand-drawing pen setting data 79.

In step S54, the information processing section 31 determines whether the user performs a touch input onto the touch panel 13. When it is determined that the user performs a touch input onto the touch panel 13 (YES in step S54), the process goes to step S55. Otherwise, (No in step S54), the process is returned to step S51 to perform the hand-drawing pen setting process and the touch detection process.

In step S55, the information processing section 31 detects coordinates indicating the touch position on the touch panel 13. In step S56, the information processing section 31 calculates a track on the touch panel 13, based on the detected coordinates and the coordinates detected in the last process. By repeatedly calculating the track, image data of the hand-drawn object can be detected.

In step S57, the information processing section 31 calculates a movement speed of the hand-drawing pen. Specifically, the information processing section 31 calculates a movement speed of the hand-drawing pen, based on the distance of the track and the cycle time (frame period) of the program.

In step S58, the information processing section 31 changes the color of the hand-drawing pen based on the movement speed of the hand-drawing pen. At this time, when the movement speed is high, the brightness is increased (or reduced) or the chromaticness is increased (or reduced). Alternatively, the size of the hand-drawing pen may be reduced with an increase in the movement speed.

In step S59, the information processing section 31 stores the hand-drawn input data into the main memory 32. At this time, the coordinates, the color information, and the size information are also stored as additional information. In step S60, the information processing section 31 converts the hand-drawn input data (track data) into image data (bit map data), and transfers the converted data to the touch panel VRAM and to the texture VRAM in the VRAM 313. Thereafter, the process is ended (returned to main routine).

Next, with reference to FIG. 11, the subroutine of the upper LCD display process will be described. In step S81, the information processing section 31 determines whether the marker is not detected for a predetermined period from the image captured by the outer imaging section 23. At this time, if a period during which the marker position is outside the imaging range of the outer imaging section 23, which is caused by that the user tilts the game apparatus 10, reaches a predetermined period, the information processing section 31 determines that the marker is not detected for the predetermined period. When it is determined that the marker is not detected for the predetermined period (NO in step S81), the process goes to step S92. Otherwise (YES in step S81), that is, if the outer imaging section 23 detects the marker before the predetermined period is elapsed when the user tilts the game apparatus 10, the process goes to step S82. Note that the marker detection may be performed in a process similar to that described for step S2.

In step S82, the information processing section 31 determines whether the button operation flag is ON. When it is determined that the button operation flag is ON (YES in step S82), the process goes to step S83. Otherwise (NO in step S82), the process goes to step S85.

In step S83, the information processing section 31 changes the position of a fundamental polygon, based on the elapsed time, and sets the fundamental polygon. As an example of change in the position of the fundamental polygon, the position of the fundamental polygon in the marker coordinate system may be changed periodically (every time a predetermined period elapses). Thereby, the fundamental polygon is set so as to jump in the vertical direction or the horizontal direction, for example. Note that the elapsed time is, for example, a time elapsed from when the button operation flag 77 was turned ON from its OFF state.

In step S84, the information processing section 31 changes the shape of the fundamental polygon, based on the elapsed time. As an example of change in the shape of the fundamental polygon, the aspect ratio of the fundamental polygon may be changed periodically (every time a predetermined period elapses). Thereby, the fundamental polygon is set so as to expand and contract laterally and/or longitudinally. Thereafter, the process goes to step S86. Note that the elapsed time is a time elapsed from when the button operation flag 77 was turned ON from its OFF state.

In step S85, the information processing section 31 sets the position of the fundamental polygon at an origin of the marker coordinate system. The origin of the marker coordinate system is, for example, a center position of the marker, In step S86, the information processing section 31 sets a polygon for shadow display in accordance with the set position and shape of the fundamental polygon. At this time, the information processing section 31 sets the polygon for shadow display at a position where the fundamental polygon is tilted at 90 degrees. Note that, when the position of the fundamental polygon is set so as to be changed, the polygon for shadow display should be set at a position according to the change.

In step S87, the information processing section 31 sets polygons for thickness display in accordance with the set position and shape of the fundamental polygon. At this time, the information processing section 31 arranges a predetermined number of polygons along the normal direction of the fundamental polygon (the fundamental polygon has a thin-plate shape). If the position of the fundamental polygon is set so as to be changed, the polygons for thickness display should be set at a position according to the change.

In step S88, the information processing section 31 applies a hand-drawn image texture to the polygons (the fundamental polygon, the polygon for shadow display, the polygons for thickness display). Note that texture data indicating the hand-drawn image texture is image data obtained by converting the hand-drawn input data, and is read from the texture VRAM. At this time, as for the polygon for shadow display, the texture data is changed so as to reduce the brightness of the hand-drawn image texture to a predetermined extent, and then the hand-drawn image texture with the reduced brightness is applied to the polygon for shadow display. Further, as for the polygons for thickness display, the texture data is changed so that the brightness of the hand-drawn image texture is gradually reduced with increasing distance from the fundamental polygon, and then the hand-drawn image texture with such brightness is applied to the polygon for thickness display.

In step S89, the information processing section 31 captures, with the virtual camera, the polygons to which the hand-drawn image texture is applied, to generate hand-drawn image (hand-drawn object image) data. Since the stereoscopic display mode is selected, a hand-drawn image for a left eye is generated based on the position and orientation of the virtual camera for the left eye, and a hand-drawn image for a right eye is generated based on the position and orientation of the virtual camera for the right eye.

In step S90, the information processing section 31 superimposes the hand-drawn image on the camera image, based on the hand-drawn image data and the camera image data. At this time, since the stereoscopic display mode is selected, the information processing section 31 superimposes the hand-drawn image for the left eye on the camera image captured by the outer imaging section (left) 23a to generate a superimposed image for the left eye, and superimposes the hand-drawn image for the right eye on the camera image captured by the outer imaging section (right) 23b to generate a superimposed image for the right eye.

In step S91, the information processing section 31 displays, on the upper LCD 22, the superimposed image in which the hand-drawn image is superimposed on the camera image. At this time, the superimposed image for the left eye and the superimposed image for the right eye are synthesized so as to enable the user to view the displayed image stereoscopically. Thereafter, this process is ended (returns to the main routine).

In step S92, the information processing section 31 displays the camera image on the upper LCD 22. Thereafter, this process is ended (returns to the main routine).

The operation of the game apparatus 10 according to the present embodiment, based on the above-described structure and flowchart, will be described with reference to FIGS. 12 to 17. In these figures, in a part where the hand-drawn image is superimposed on the marker in the upper LCD 22, both the hand-drawn image and the marker are displayed actually. However, in order to clarify the expression in the figures, a part of the marker is not displayed. Further, although the following will describe a case where the user tilts the game apparatus 10 without moving the marker, the user may move the marker. Moreover, the user may move the marker, and simultaneously, the user may tilt the game apparatus 10.

(Fundamental Display of Hand-drawn Object)

The user selects the outer imaging section 23, and selects the stereoscopic display mode, thereby setting the game apparatus 10 to execute the above-described program. If the user takes, with the outer imaging section 23, a range including the marker placed on a desk or the like, camera image data is obtained (step S1). When the marker is detected (YES in step S2), the positional relation between the outer imaging section 23 and the marker is calculated based on the marker detection result (step S3), and the position and orientation of the virtual camera are determined based on the calculated positional relation (step S4).

Figure 12:
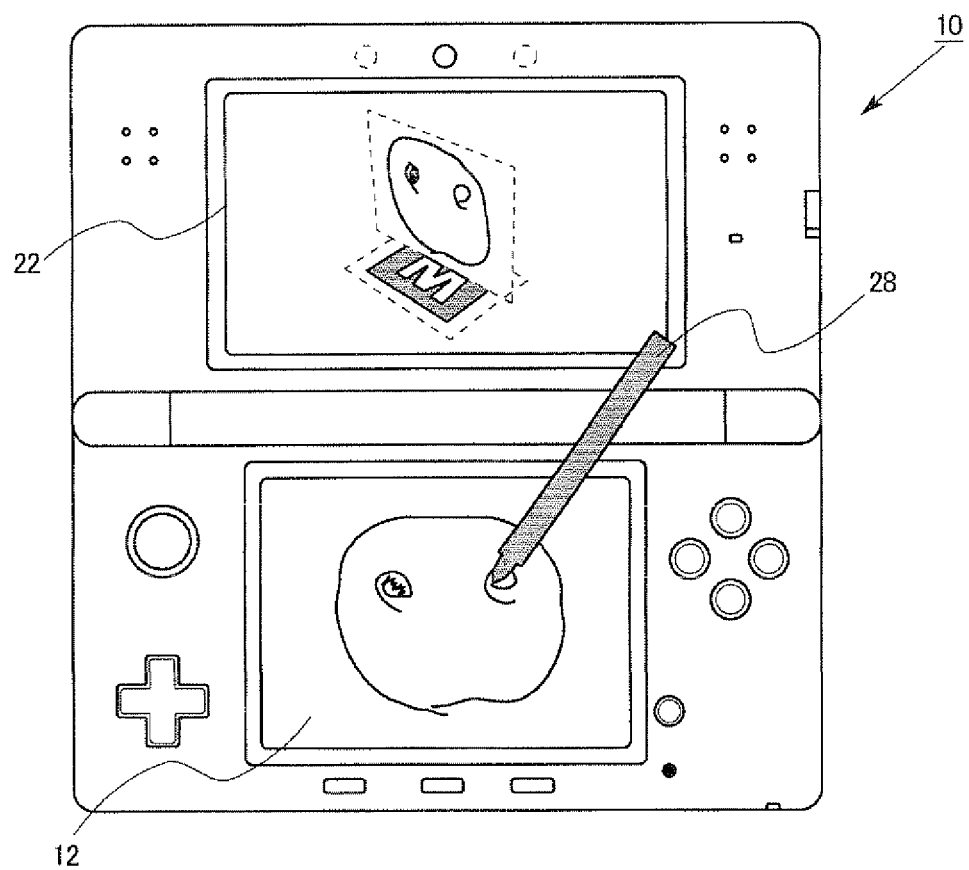
FIG. 12 is a diagram illustrating a state in which a user draws an object to be displayed on the upper LCD 22, by using a touch panel 13.

In such a situation, as shown in FIG. 12, the user hand-draws (hand-writes) a face of a person on the lower LCD 12. It is assumed that the user does not request to change the color and the size of the hand-drawing pen, that is, the hand-drawing is performed with the initial values of the hand-drawing pen (NO in step S1). FIG. 12 shows a state where the user draws the face halfway. When the user touches the lower LCD 12 with the touch pen 28 (step S54), coordinates are detected (step S55), a track is detected (step S56), a movement speed of the pen is calculated (step S57), and the color of the hand-drawing pen is changed according to the movement speed (step S58). Hand-drawn input data is converted to image data, and the image data is stored in the main memory 32 (step S59) and transferred to the touch panel VRAM and to the texture VRAM (step S60).

Figure 11:
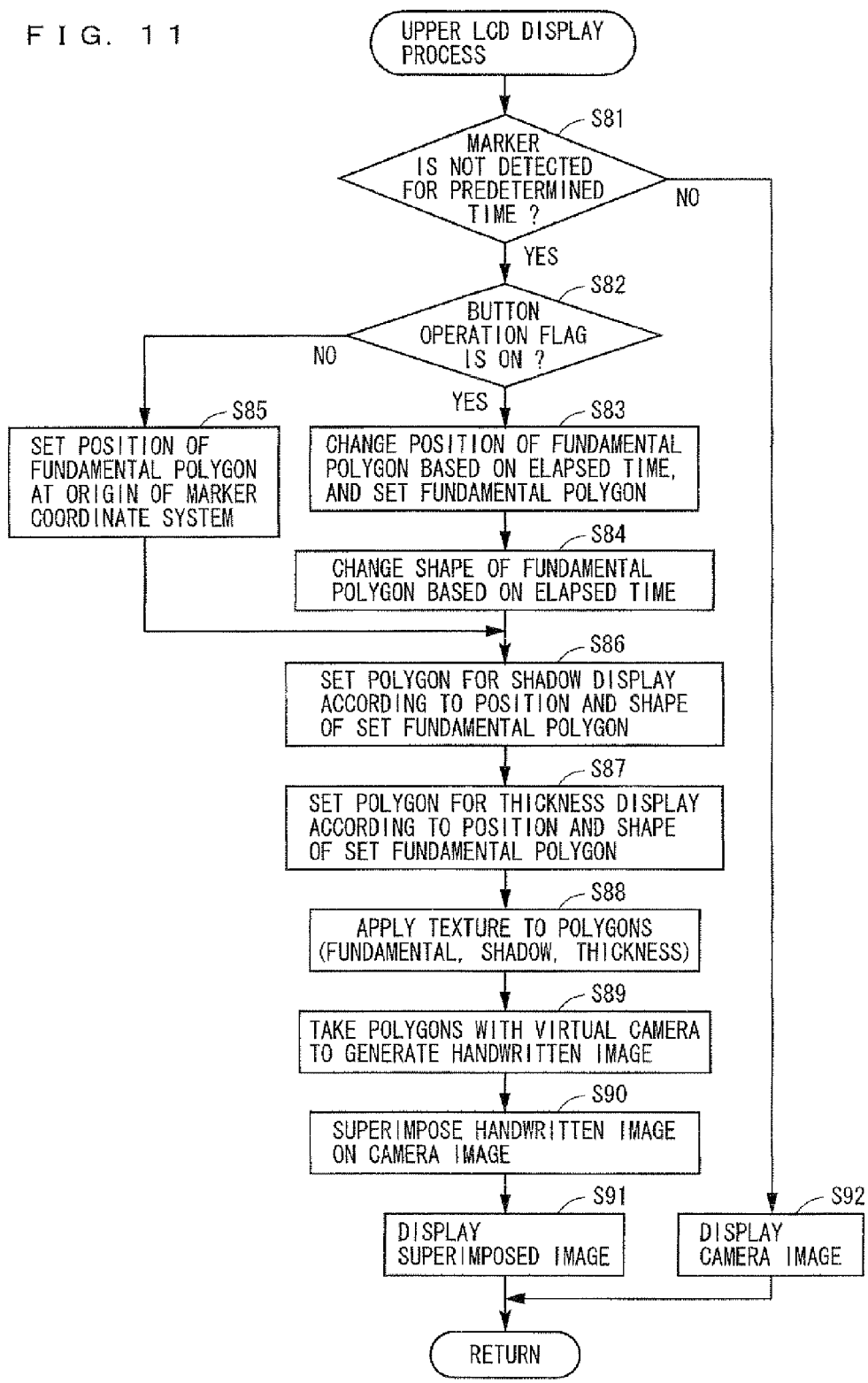
FIG. 11 is a flowchart illustrating in detail a display process (step S8) on an upper LCD 22.

Even in the middle of such hand-drawing, since the program shown in FIGS. 9 to 11 is operated periodically (at a predetermined cycle time), the halfway hand-drawn object is displayed on the upper LCD 22 as shown in FIG. 12.

The following will describe the operation of the game apparatus 10 in a case where the hand-drawn object is displayed as shown in FIG. 12. The operation in a case where a predetermined button is not pressed will be initially described, followed by the operation in a case where the predetermined button is pressed.

Since the predetermined button is not pressed (NO in step S6), the button operation flag is not updated but maintained at "0". If the marker is detected before a predetermined period elapses (YES in step S81), since the button operation flag is OFF (NO in step S82), the position of the fundamental polygon is set at the origin of the marker coordinate system (step S85).

A shadow and/or a thickness may be applied to the hand-drawn object as necessary. The operation in such a case will be described later. The hand-drawn image texture is applied to the fundamental polygon (step S88), and the polygon to which the hand-drawn image texture is applied is captured by the virtual camera to generate hand-drawn image (hand-drawn object image) data (step S89). The hand-drawn image is superimposed on the camera image (step S90), and the superimposed image is displayed on the upper LCD 22 (step S91). At this time, as shown in FIG. 12, the halfway hand-drawn object is displayed on the upper LCD 22 so as to be located at the origin of the marker coordinate system. Note that the marker coordinate system and its origin have previously been set. As shown in FIG. 12, the hand-drawn object is also displayed on the lower LCD 12 (step S9).

As the user advances hand-drawing, the above-described operation is repeated. As shown in FIG. 13, the object hand-drawn by the user is displayed, on the upper LCD 22, in the stereoscopic display mode as if it exists in a three-dimensional virtual space, and simultaneously, the hand-drawn object is planarly displayed on the lower LCD 12.

(A Case where the Game Apparatus 10 is Tilted)

As shown in FIG. 14A (corresponding to FIG. 13 from which the touch pen 28 is removed), when the object hand-drawn by the user is displayed on the upper LCD 22 as if it exists in the three-dimensional virtual space, the user tilts the game apparatus 10 within the range where the marker is captured by the outer imaging section 23. Herein, the game apparatus 10 is tilted (rotated) at about 90 degrees in a clockwise fashion, centering around the marker.

Even when the game apparatus 10 is tilted, since the program shown in FIGS. 9 to 11 is operated periodically (at a cycle time), camera image data is successively obtained by the outer imaging section 23 (step S1), the marker is detected (YES in step S2), the positional relation between the outer imaging section 23 and the marker is successively calculated based on the marker detection result (step S3), and the position and orientation of the virtual camera are determined based on the calculated positional relation (step S4). The position of the fundamental polygon is successively set at the origin of the marker coordinate system (step S85), the hand-drawn image texture is applied to the fundamental polygon (step S88), the polygon to which the hand-drawn image texture is applied is captured by the virtual camera to generate hand-drawn image (hand-drawn object image) data (step S89), the hand-drawn image is superimposed on the camera image (step S90), and the superimposed image is successively displayed on the upper LCD 22 (step S91).

Figure 14B:
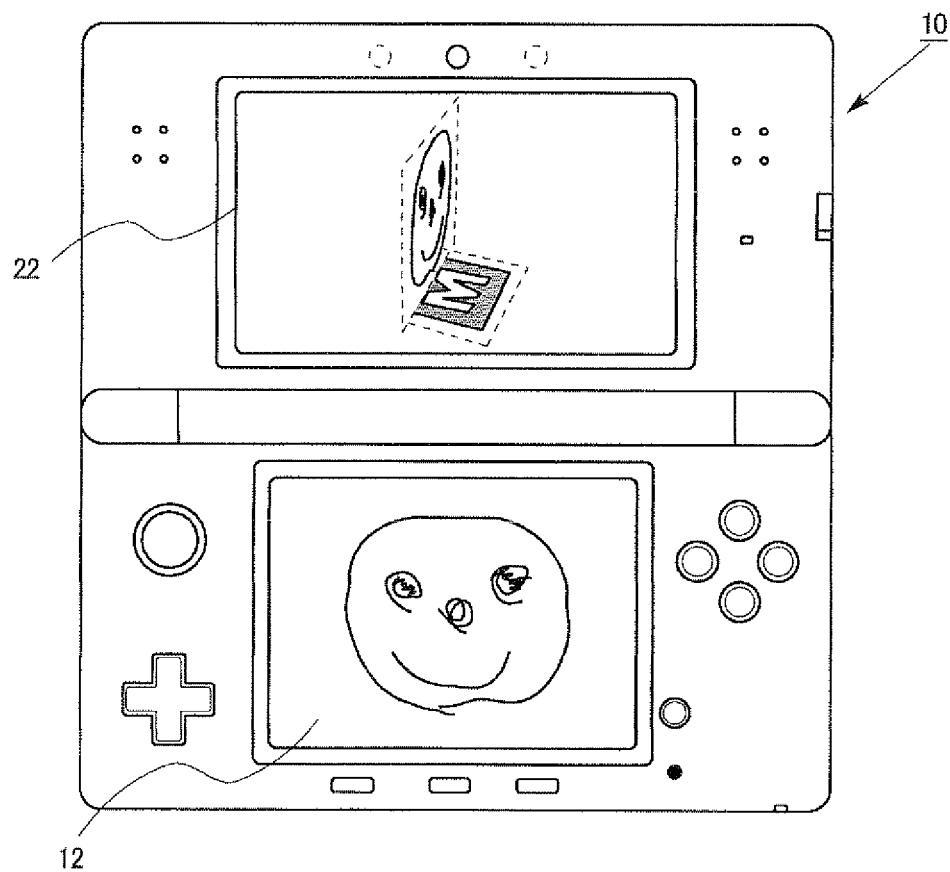

When, in the state shown in FIG. 14A, the game apparatus 10 is tilted at about 90 degrees in a clockwise fashion centering around the marker, the display on the upper LCD 22 is changed to the state shown in FIG. 14B. As shown in FIGS. 14A and 14B, the relative positions of the virtual camera and the fundamental polygon are changed based on the result of recognition of the marker which is included in the image successively captured by the outer imaging section 23. Therefore, when the imaging direction is changed by tilting the game apparatus 10, the relative positions of the virtual camera and the fundamental polygon are changed in accordance with a change in the manner in which the marker is visible. Therefore, the display of the hand-drawn image captured by the virtual camera is changed in accordance with the change in the imaging direction due to the tilting of the game apparatus 10. In this way, the image hand-drawn by the user is displayed as if it exists in the real world, and thus augmented reality can be realized.

(A Case where a Predetermined Button is Pressed: Positional Change of Fundamental Polygon)

When a predetermined button is pressed (YES in step S6), the button operation flag is updated and changed to "1" (ON) (step S7). If the marker is detected before a predetermined time elapses (YES in step S81), since the button operation flag is ON (YES in step S82), the position of the fundamental polygon (the relative position and the relative orientation to the origin of the marker coordinate system) is set based on the elapsed time (step S83).

At this time, the display position of the fundamental polygon is changed so as to periodically reciprocate in the vertical direction. The hand-drawn image texture is applied to the fundamental polygon (step S88), and the polygon to which the hand-drawn image texture is applied is captured by the virtual camera to generate hand-drawn image (hand-drawn object image) data (step S89). The hand-drawn image is superimposed on the camera image (step S90), and the superimposed image is displayed on the upper LCD 22 (step S91). At this time, the hand-drawn image is displayed so as to jump in the vertical direction or the horizontal direction. Therefore, the image hand-drawn by the user can be displayed more naturally as if it exists in the real world.

(A Case where a Predetermined Button is Pressed: Shape Change of Fundamental Polygon)

The following will describe the operation in a case where the shape of the fundamental polygon is changed when a predetermined button is pressed as described above.

Since the button operation flag is ON (YES in step S82), the shape of the fundamental polygon is changed with time (step S84). For example, the aspect ratio of the fundamental polygon is changed periodically (every time a predetermined period elapses). The hand-drawn image texture is applied to the fundamental polygon (step S88), and the polygon to which the hand-drawn image texture is applied is captured by the virtual camera to generate hand-drawn image (hand-drawn object image) data (step S89). The hand-drawn image is superimposed on the camera image (step S90), and the superimposed image is displayed on the upper LCD 22 (step S91). At this time, the hand-drawn image is displayed so as to expand and contract laterally and/or longitudinally.

Figure 15A:
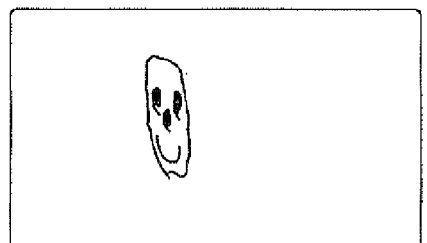
FIGS. 15A and 15B are diagrams illustrating an example of change in a displayed shape of a hand-drawn image (object image)
Figure 15B:
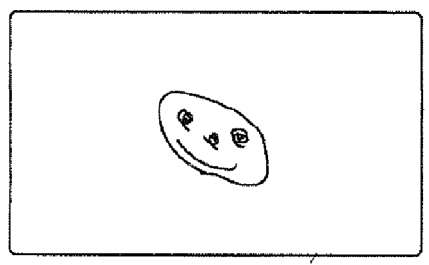

FIGS. 15A and 15B show examples of display on the upper LCD 22. FIG. 15A shows an example of display in which the fundamental polygon expands longitudinally (contracts laterally), and FIG. 15B shows an example of display in which the fundamental polygon expands laterally (contracts longitudinally). Actually, since the aspect ratio of the fundamental polygon changes periodically, the display shown in FIG. 15A and the display shown in FIG. 15B are alternately displayed at short intervals. Therefore, the hand-drawn image is displayed as if the facial expression changes. Thereby, the image hand-drawn by the user can be displayed more naturally as if it exists in the real world.

In addition to the change in the shape of the fundamental polygon, the position of the fundamental polygon may be changed as described above. In this case, the hand-drawn image is displayed such that the face jumps in the vertical direction or the horizontal direction while changing its expression. Accordingly, more natural augmented reality can be realized.

(A Case where Shadow or Thickness is Applied)

The following will describe the operation in a case where a shadow or a thickness is applied, regardless of whether a predetermined button is pressed.

Regardless of whether the button operation flag is ON or OFF, a polygon for shadow display is set according to the position and the shape of the fundamental polygon (step S86). At this time, if the position of the fundamental polygon is changed, the polygon for shadow display is set at a position according to the change. Therefore, if the position of the fundamental polygon is changed such that the hand-drawn image jumps in the vertical direction or the horizontal direction, a shadow according to the jumping hand-drawn image is displayed.

Further, polygons for thickness display are set according to the position and the shape of the fundamental polygon (step S87). At this time, a predetermined number of polygons for thickness display are arranged. Therefore, if the position of the fundamental polygon is changed, the polygons for thickness display are set at a position according to the change. Therefore, if the position of the fundamental polygon is changed such that the hand-drawn image jumps in the vertical direction or the horizontal direction, a thickness according to the jumping hand-drawn image is displayed.

The texture is applied to the fundamental polygon, the polygon for shadow display, and the polygons for thickness display (step S88), and the polygons to which the texture is applied are captured by the virtual camera to generate hand-drawn image (hand-drawn object image) data (step S89). The hand-drawn image is superimposed on the camera image (step S90), and the superimposed image is displayed on the upper LCD 22 (step S91).

Figure 16A:
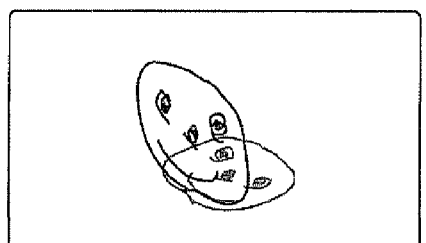
FIGS. 16A and 16B are diagrams illustrating another example of change in the displayed shape of the hand-drawn image (object image)
Figure 16B:
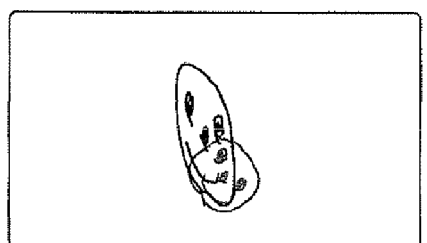

FIGS. 16A and 16B show examples of display on the upper LCD 22 in the case where a shadow is applied. As shown in these figures, the hand-drawn image having a shadow is displayed. Therefore, the image hand-drawn by the user can be displayed more naturally as if it exists in the real world.

Figure 17A:
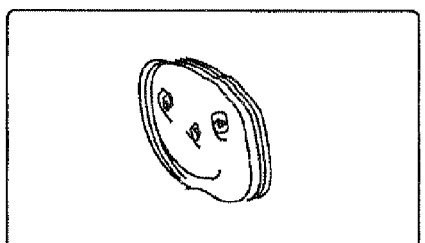
FIGS. 17A and 17B are diagrams illustrating still another example of change in the displayed shape of the hand-drawn image (object image).
Figure 17B:
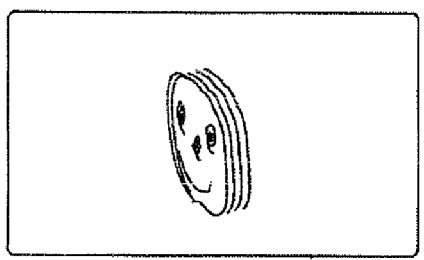

FIGS. 17A and 17B show examples of display on the upper LCD 22 in the case where a thickness is applied. As shown in these figures, the hand-drawn image having a thickness is displayed. Therefore, the image hand-drawn by the user can be displayed more naturally as if it exists in the real world.

(A Case where no Marker is Detected for a Predetermined Period)

For example, if the user excessively tilts the game apparatus 10, the marker may not be captured by the outer imaging section 23. In this case, since the marker is not detected from the captured image for a predetermined period (NO in step S81), the camera image is displayed on the upper LCD 22 without executing setting of the fundamental polygon (step S92). At this time, neither the marker nor the hand-drawn image are displayed on the upper LCD 22, and only the landscape captured by the outer imaging section 23 is displayed.

As described above, according to the game apparatus 10 of the present invention, an image hand-drawn on the touch panel by the user is displayed on a landscape (background) captured by the outer imaging section 23 so as to be changed in its display position, changed in its shape, given a shadow, and/or given a thickness, and thus an image providing natural augmented reality can be displayed on the upper LCD 22. Therefore, it is possible to cause the user to have stronger sense of reality for the hand-drawn image, or stronger interest in the hand-drawn image. In this case, even an image, which is in the middle of being drawn on the touch panel, can be displayed on the upper LCD 22. Accordingly, the user can complete the image being hand-drawn while checking the augmented reality.

(Modifications)

In step S86, the shape of the fundamental polygon is changed, and the texture is applied to the shape-changed fundamental polygon, thereby changing the shape of the hand-drawn object. However, the present invention is not limited thereto. The shape of the texture may be deformed.

Further, the game apparatus 10 of the present embodiment may execute a predetermined game. For example, a predetermined game program is stored in the internal data storage memory 35 or the external memory 44, and the game apparatus 10 executes the program to perform a game. For example, in the game, the hand-drawn object created on the lower LCD 12 by the user is displayed on the upper LCD 22.

Further, the present invention is applicable not only to a game apparatus but also to any hand-held electronic device (for example, a PDA (Personal Digital Assistant) or a mobile telephone), a personal computer, a camera, and the like.

Further, in the present embodiment, the information processing section 31 of the game apparatus 10 executes the predetermined program, and thereby the hand-drawn object display process according to the above flowchart is performed. However, the present invention is not limited thereto. A portion of or all of the hand-drawn object display process may be performed by a special circuit included in the game apparatus 10.

Further, while in the present embodiment the above-described processes are performed by one game apparatus (the information processing apparatus), a plurality of information processing apparatuses which are communicably connected to each other may cooperate with each other to perform the above-described processes.

Further, instead of applying a hand-drawn image as a texture to one polygon, a 3D polygon model having a shape according to a hand-drawn image may be successively created to be arranged in place of the fundamental polygon.

Further, in the present embodiment, the touch panel 13 is adopted as an input means for inputting hand-drawn data indicating a hand-drawn object constituted by a hand-drawn track. However, the present invention is not limited thereto. For example, the input means may be a pointing device such as a mouse or a touch pad. Alternatively, the input means may be configured such that an orientation of an input device is detected by a camera or an acceleration sensor, and a position on a certain plane, which is pointed by the input device, is calculated based on the detected orientation, thereby inputting hand-drawn data. Alternatively, the input means may be configured such that, when a cursor displayed on the lower LCD 12 is moved by the cross button 14A while pressing the button 14C, a track that follows the moving cursor is inputted as hand-drawn data.

Further, in the present embodiment, the video see-through method is adopted, in which a hand-drawn image is superimposed on a camera image captured by the outer imaging section 23, and a superimposed image is displayed on the upper LCD 22. However, the present invention is not limited thereto. For example, the present invention may have a configuration to realize the optical see-through method. In this case, a head mounted display has at least a camera, and a user can view a real space through a display section corresponding to lenses of glasses. This display section is made of a material through which the real space is directly guided to the user's eyes. Further, an image of a virtual object generated by a computer can be displayed on this display section. Thereby, the user can view an image in which an image of the virtual object is superimposed on the real space. Note that the camera included in the head mounted display is used to detect a marker placed in the real space.

While the invention has been described in detail, the foregoing description is in all aspects illustrative and not restrictive. It will be understood that numerous other modifications and variations can be devised without departing from the scope of the invention.

What is claimed is:

1. A non-transitory computer-readable storage medium having stored therein an information processing program which causes a computer of an information processing apparatus, which is connected to an imaging device, an input device operated by a user, and a display device having a screen on which the user can view a real space, to execute the information processing program to provide:

captured image data obtaining for successively obtaining captured image data indicating an image captured by the imaging device;

input data obtaining for successively obtaining, from the input device, user input data based on an operation of the user;

detection for detecting a specific target from the captured image data successively obtained by the captured image data obtaining;

calculation for calculating relative positions of the imaging device and the specific target, based on a result of the detection for the specific target;

virtual camera setting for successively setting a virtual camera in a virtual space, based on a result of the calculation by the calculation;

generation for capturing, using the virtual camera, an object in the virtual space, which is indicated by the user input data successively obtained by the input data obtaining, to generate an object image corresponding to the object; and display control for causing the display device to successively display a superimposed image in which the object image generated by the generation is superimposed on the real space on the screen.

2. The computer-readable storage medium according to claim 1, wherein the input device is configured by a pointing device;

the input data obtaining obtains, at a predetermined time interval, input data indicating an object which is configured by a hand-drawn trajectory inputted to the pointing device; and the display control causes the display device to display the superimposed image in which the degree of progress of the hand-drawing in the predetermined time interval is reflected.

3. The computer-readable storage medium according to claim 1, wherein the display device includes a first screen area on which the superimposed image is displayed; and a second screen area different from the first screen area; and the display control causes the display device to display the superimposed image on the first screen area, and causes the display device to display the inputted image on the second screen area.

4. The computer-readable storage medium according to claim 1, wherein the information processing program further causes the computer to change a display manner of the object; and the display control causes the display device to successively display a superimposed image in which object image data indicating an object whose display manner is changed is superimposed on the captured image data.

5. The computer-readable storage medium according to claim 4, wherein the change changes a display position of the object in accordance with a predetermined rule.

6. The computer-readable storage medium according to claim 5, wherein the change changes the display position of the object in accordance with a passage of time.

7. The computer-readable storage medium according to claim 4, wherein the change changes a display shape of the object.

8. The computer-readable storage medium according to claim 7, wherein the change changes the display shape of the object to a display shape in which a shadow of the object is applied to the object.

9. The computer-readable storage medium according to claim 4, wherein the change changes a thickness of the object.

10. The computer-readable storage medium according to claim 9, wherein the change changes the thickness of the object by arranging a plurality of the objects.

11. An information processing apparatus comprising:
an imaging device for capturing an image;
an input device operated by a user by which the user inputs an image;
a display having a screen on which the user can view a real space;
a captured image data obtaining arrangement for successively obtaining captured image data indicating the image captured by the imaging device;
an input data obtaining arrangement for successively obtaining, from the input device, user input data based on an operation of the user;
a detector for detecting a specific target from the captured image data successively obtained by the captured image data obtaining structure;
a calculator for calculating relative positions of the imaging device and the specific target, based on a result of the detection for the specific target;
a virtual camera setter for successively setting a virtual camera in a virtual space, based on a result of the calculation by the calculator;
an object image generator for capturing, using the virtual camera, an object in the virtual space, which is indicated by the user input data successively obtained by the input data obtaining arrangement, to generate an object image corresponding to the object; and
a display controller for causing the display to successively display a superimposed image in which the object image generated by the object image generator is superimposed on the real space on the screen.

12. An information processing system comprising:
an imaging device for capturing an image;
an input device operated by a user by which the user inputs an image;
a display having a screen on which the user can view a real space;
a captured image data obtaining arrangement for successively obtaining captured image data indicating the image captured by the imaging device;
an input data obtaining arrangement for successively obtaining, from the input device, user input data based on an operation of the user;
a detector for detecting a specific target from the captured image data successively obtained by the captured image data obtaining arrangement;
a calculator for calculating relative positions of the imaging device and the specific target, based on a result of the detection for the specific target;
a virtual camera setter for successively setting a virtual camera in a virtual space, based on a result of the calculation by the calculator;
an object image generator for capturing, using the virtual camera, an object in the virtual space, which is indicated by the user input data successively obtained by the input data obtaining arrangement, to generate an object image corresponding to the object; and
a display controller for causing the display to successively display a superimposed image in which the object image generated by the object image generator is superimposed on the real space on the screen.

13. An information processing method comprising:
capturing an image;
inputting an image with an input device operated by a user;
displaying so the user can view a real space on a screen on which the user can view a real space;
using at least one processor, successively obtaining captured image data indicating the captured image;
using the at least one processor, successively obtaining, from the input device, user input data based on an operation of the user;
using the at least one processor, detecting a specific target from the successively obtained captured image data;
using the at least one processor, calculating relative positions of the imaging device and the specific target, based on a result of the detection for the specific target;
using the at least one processor, successively setting a virtual camera in a virtual space, based on a result of the calculation;
capturing, using the virtual camera, an object in the virtual space, which is indicated by the successively obtained user input data, to generate an object image corresponding to the object; and
using the at least one processor, causing the display to successively display a superimposed image in which the generated object image is superimposed on the real space on the screen.

* * * * *